(12) United States Patent
Xu et al.

(10) Patent No.: US 12,417,082 B1
(45) Date of Patent: Sep. 16, 2025

(54) FRONTIER NODE-BASED DATA LAYOUT ANALYSIS FRAMEWORK

(71) Applicant: Amazon Technologies, Inc., Seattle, WA (US)

(72) Inventors: Sheng Xu, Mountain View, CA (US); Hongbin Zheng, San Jose, CA (US); Qingrui Liu, San Jose, CA (US); Jason Xiong, Albuquerque, NM (US)

(73) Assignee: Amazon Technologies, Inc., Seattle, WA (US)

( * ) Notice: Subject to any disclaimer, the term of this patent is extended or adjusted under 35 U.S.C. 154(b) by 842 days.

(21) Appl. No.: 17/657,079

(22) Filed: Mar. 29, 2022

(51) Int. Cl.
*G06F 8/41* (2018.01)
*G06N 3/082* (2023.01)

(52) U.S. Cl.
CPC .............. *G06F 8/433* (2013.01); *G06N 3/082* (2013.01)

(58) Field of Classification Search
None
See application file for complete search history.

(56) References Cited

U.S. PATENT DOCUMENTS

| | | | |
|---|---|---|---|
| 11,144,291 B1* | 10/2021 | Zheng | G06N 3/042 |
| 11,809,849 B1* | 11/2023 | Zheng | G06N 3/048 |
| 2018/0293057 A1* | 10/2018 | Sun | G06N 3/08 |
| 2019/0080239 A1* | 3/2019 | Yang | G06N 3/045 |
| 2019/0391796 A1* | 12/2019 | Brady | G06F 8/458 |
| 2019/0392296 A1* | 12/2019 | Brady | G06N 3/063 |
| 2020/0379740 A1* | 12/2020 | Paek | G06N 3/045 |
| 2022/0222084 A1* | 7/2022 | Sun | G06F 9/5027 |

\* cited by examiner

*Primary Examiner* — Qing Chen
(74) *Attorney, Agent, or Firm* — Weaver Austin Villeneuve & Sampson LLP

(57) ABSTRACT

Techniques for determining a compatible data layout for a computational flow being executed on an integrated circuit device may include obtaining a representation of a set of connected nodes representing loopnests in a compute flow graph. Those of the nodes in the set of connected nodes that are associated with operators having a fixed data layout can be initialized into a set of layout groups. A set of merging operations can then be iteratively performed to form a single layout group from the set of connected nodes. The set of merging operations may include identifying a set of frontier nodes adjacent to the set of layout groups, determining an initialization cost of each of the frontier nodes, selecting a frontier node having a lowest initialization cost, and merging the selected frontier node with one or more adjacent layout groups to form a new layout group having a compatible data layout.

20 Claims, 18 Drawing Sheets loopnest
302

```
for b in range (0,100):          (B)
    for i in range (0, 448):     (F)
        for j in range (0, 64):  (F)
            for k in range (0, 4):   (P)
                C[ j, i ] += A[ k, i ] * B[ k, j ]
``` shape of C: [64, 448]
layout of C: [P,F],  ◄- - - - - - - loopnest
304

```
for r1 in range (0,64):          (F)
    for r2 in range (0, 448):    (F)
        output_0 += C[ r1, r2 ]
``` data layout conflict layout of C: [F,F]  ◄- - - - - - -

Free axis (F) = axis indexing elements of a tensor within a partition
Partition axis (P) = axis indexing different partitions of a tensor
Block axis (B) = axis unrolled into multiple instructions

FIG. 3A loopnest
302 for *b* in range (0,100):    (B)
      for *i* in range (0, 448):    (F)
        for *j* in range (0, 64):    (F)
          for *k* in range (0, 4):    ~~(P)~~→ (B)
            C[ *j, i* ] += A[ *k, i* ] * B[ *k, j* ]

shape of C: [64, 448]
layout of C: ~~[P,F]~~→ [B,F]

transpose
303

BF transpose [B,F] → [F,F]

loopnest
304 for *r1* in range (0,64):    (F)
   for *r2* in range (0, 448):    (F)
      output_0 += C[ *r1, r2* ]

layout of C: [F,F]

Free axis (F) = axis indexing elements of a tensor within a partition
Partition axis (P) = axis indexing different partitions of a tensor
Block axis (B) = axis unrolled into multiple instructions

FIG. 3B

FRONTIER NODE-BASED DATA LAYOUT ANALYSIS FRAMEWORK

BACKGROUND

Neural networks utilize computational models to perform complex tasks such as image recognition, natural language processing, among others. A neural network can involve various computations such as matrix multiplication operations, activation operations, pooling operations, etc. Neural networks can be executed on specialized hardware such as neural network accelerators that have circuitry tailored to perform common neural network computations.

BRIEF DESCRIPTION OF THE DRAWINGS

Various embodiments in accordance with the present disclosure will be described with reference to the drawings, in which:

FIGS. 3A-3B illustrate an example of resolving a data layout conflict;

DETAILED DESCRIPTION

Figure 1:
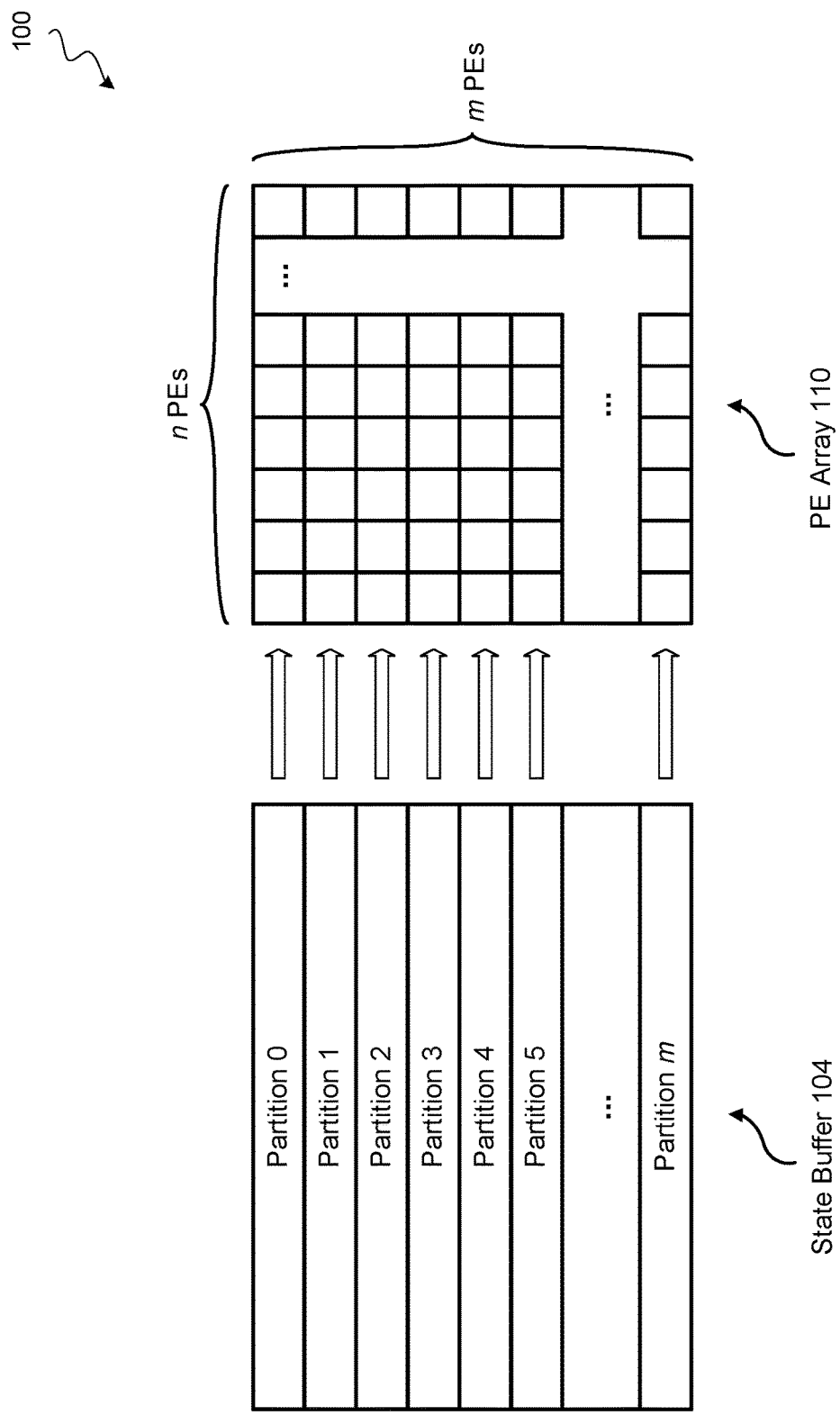
FIG. 1 illustrates a block diagram of selected components of an example of a neural network accelerator.

Data layout analysis is a technique to analyze the computations of a computation flow to determine how computational data can be mapped to the structure of the hardware executing the computations. The computational result of a computation can be stored in the hardware according to a certain data layout (e.g., a 2-dimensional tensor stored in a buffer memory across multiple partitions). If the computational result is consumed by a subsequent computation, and the data layout of the computational result is not arranged in the buffer memory in a manner compatible with the subsequent computation, certain data rearrangement operations may be needed to reorganize the data for the subsequent computation. For example, if the subsequent computation is a pooling operation performed by a pooling engine that can only read data from a single memory partition, the data elements of the 2-dimensional tensor stored across the multiple partitions can be flattened and consolidated into a single memory partition such that the pooling engine can access the data. As another example, if the subsequent operation involves a matrix multiplication operation of a transposition of the 2-dimensional tensor, a transpose operation can be performed to swap the rows and columns of the data elements stored in the buffer memory.

Part of the data layout analysis is to determine whether each tensor dimension is stored across partitions, within a partition, or can be unrolled into multiple instructions. This determination can be based on the data layout requirements of the producer of the tensor and/or the consumer of the tensor. Data layout analysis also decides which tensor transposes to insert, and how to transpose the tensors to resolve data layout conflicts between two operations sharing the same tensor. Data layout convergence is achieved when the data layout for each computation in a computational flow and the appropriate data rearrangement operations between computations are determined according to restrictions imposed by the hardware.

One way to achieve data layout convergence is to start at the beginning of the computational flow and propagate the data layout from the initial computation to the subsequent computations in a topological or random order. Data rearrangement operations can be inserted along the way as needed to rearrange the data for each computation. However, such an approach may not always produce the most effective layout transformations, resulting in excessive instructions and memory accesses to perform the data rearrangements. This can lead to a degradation in performance by increasing the latency on the computational flow and reducing overall computational throughput.

The techniques disclosed herein provide a data layout analysis framework that can be utilized by a compiler to effectively achieve data layout convergence while limiting the instruction count, transpose operations, and accesses to system memory. The computations of a neural network model can be represented as loopnests, and the loopnests connected with each other in the computational flow can be analyzed using a frontier-based approach to choose the optimal order of exploration. With the frontier-based approach, loopnests having the most prior information available are selected for analysis first. This provides a more global view of the connected loopnests to find a globally optimal solution as compared to traversing the loopnests in a topological or random order. For each selected loopnest being analyzed, a set of possible layout candidates are considered, and the optimal candidate according to a cost function for implementing the layout is chosen for the loopnest. This allows more layout candidates to be considered as compared to the propagation approach. The data layout analysis framework also uses a transpose engine to select an optimal transpose path between two conflicting layouts to achieve convergence.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of a simplified hardware architecture of a neural network accelerator 100. The neural network accelerator 100 includes a processing engine (PE) array 110 and a state buffer 104. State buffer 104 is an on-chip memory that acts as a cache for PE array 110. PE array 110 includes processing engines arranged in rows and columns. In the example shown, PE array 110 includes m×n number of processing engines. In some implementations, m=n=128 and PE array 110 can be a 128×128 array. Each processing engine may include a multiplier circuit and an adder circuit to perform a multiply-and-add operation. In some implementations, PE array 110 can support tiling to concurrently perform one or more matrix multiplication operations.

During operation, values such as feature map and/or weight values are shifted horizontally along the row direction into PE array 110 from state buffer 104. The multiplication results are accumulated vertically and written into a partial sum (PSUM) buffer (not shown) along the column direction. The accumulated results can be written back to the state buffer from the PSUM buffer, and be used as inputs for subsequent computations. State buffer 104 may include the same number of row partitions as the number of rows in PE array 110. Each row of state buffer 104 feeds into one row of the PE array 110. In the example shown, if the PE array 110 has 128 rows (m=128), then the state buffer 104 may include m=128 number of row partitions. Because each row partition of state buffer 104 feeds into a corresponding row in PE array 110 (e.g., row partition 0 feeds into row 0 of PE array, row partition 1 feeds into row 1 of PE array, etc.), a tensor that is subject to a matrix multiplication computation to be performed in PE array 110 will have data elements spanning across multiple row partitions of state buffer 104, and across multiple memory locations within each row partition of the multiple row partitions.

In addition to PE array 110, neural network accelerator 100 may include other compute engines that accesses data from state buffer 104. For example, neural network accelerator 100 may include an activation engine, a pooling engine, and/or a vector compute engine that performs other types of computations. In some implementations, the hardware architecture of neural network accelerator 100 may require the input data for a computation being performed by one of these compute engines to be loaded from the same row partition of state buffer 104.

Although accessing state buffer 104 can be much faster than accessing system memory such as dynamic random access memory (DRAM), state buffer 104 can be limited in size and may lack sufficient capacity to store all the computational data used by a neural network at once. Hence, during execution of a neural network, state buffer 104 may exchange data with system memory (e.g., using direct memory access (DMA)) to obtain data that the neural network is expected to operate on. Furthermore, state buffer 104 may access system memory to rearrange the data being store in state buffer 104 for loading into PE array 110 and the other compute engines. Although some implementation of the neural network accelerator 100 has the capability to perform a matrix transpose operation using the datapath between the state buffer 104, PE array 110, and the PSUM buffer, more complicated rearrangement of data can be performed by copying the data to system memory and writing back the data into target locations in state buffer 104. Having a suitable data layout for the computational data can reduce the number of system memory accesses and the amount of data rearrangements such that the state buffer 104 can be used efficiently.

Figure 2:
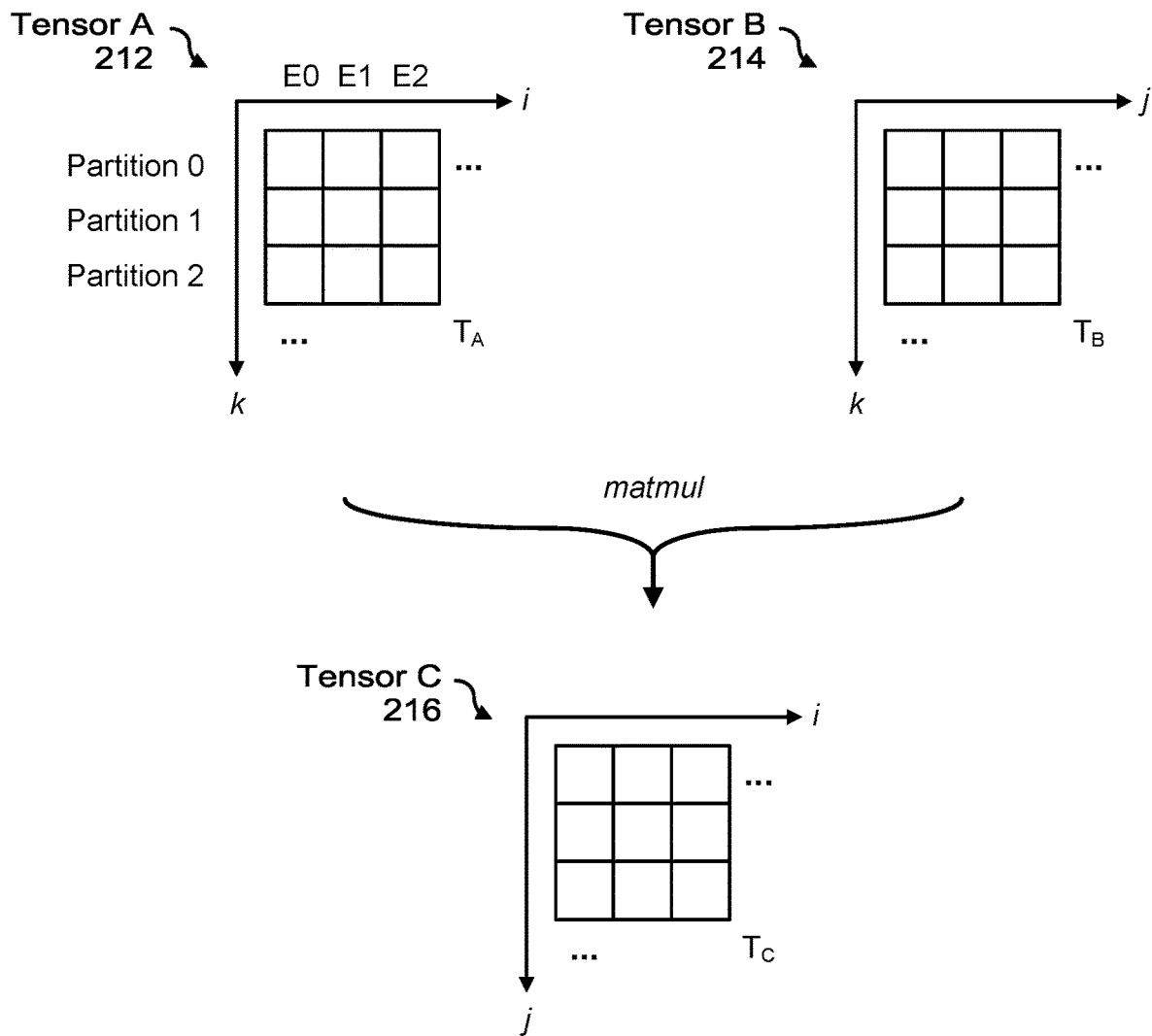
FIG. 2 illustrates a conceptual diagram of an example of a matrix multiplication operation.

FIG. 2 illustrates an example of a matrix multiplication operation. The matrix multiplication operation can be represented using a loopnest 202. In the example shown, tensor A 212 is being multiplied with tensor B 214. Tensor A 212 can be indexed using the variables k and i in loopnest 202 as A[k, i], and tensor B 214 can be indexed using the variables k and j in the loopnest 202 as B[k, j]. To perform the matrix multiplication operation in a PE array, tensor A 212 can be arranged with k indexing into the row partitions, and i indexing into the data elements within a row partition. Similarly, tensor B 214 can be arranged with k indexing into the row partitions, and j indexing into the data elements within a row partition. With this data layout for tensor A 212 and tensor B 214, the PE array can multiply each element in tensor A 212 with a corresponding element in tensor B 214, and accumulate the multiplication results along the column direction to generate tensor C 216, which is indexed using the variables j and i in loopnest 202 as C[j, i], with j indexing into the row partitions, and i indexing into the data elements within a row partition.

FIG. 3A illustrates an example of a data layout conflict. Loopnest 302 is the same as loopnest 202 representing a matrix multiplication operation as explained with reference to FIG. 2. Loopnest 304 represents a subsequent operation that uses the result of the matrix multiplication of loopnest 302. In particular, loopnest 304 is a reduce operation that sums all elements of tensor C. In some implementations of the neural network accelerator, such a reduce operation can be performed by a pooling engine. However, a data layout conflict may occur if the pooling engine is configured to read data elements for a particular operation from the same row partition, because tensor C has data elements across multiple row partitions that are indexed by j, as shown in FIG. 2.

To assist with identifying and resolving such data layout conflicts, the iterators (iteration variable) of each loop in a loopnest can be classified into one of three types of axes: free axis, partition axis, or a block axis. A free axis refers to an iterator that indexes into a sequential dimension such as elements of a tensor with a row partition. A partition axis refers to an iterator that indexes into a parallel dimension such as different row partitions of a tensor. A block axis refers to an iterator that unrolls into multiple instructions.

Referring to loopnest 302, the first loop over iterator b is classified into a block axis (B), because the iterator b does not index into elements of a row partition or index into different partitions. Instead, each iteration of b will be unrolled into an individual instruction. The second loop over iterator i is classified into a free axis (F), because the iterator i indexes into the data elements of a row partition in tensor A. The third loop over iterator j is also classified into a free axis (F), because the iterator j indexes into the data elements of a row partition in tensor B. The fourth loop over iterator k is also classified into a partition axis (P), because the iterator k indexes into the different row partitions of tensor A and tensor B. The resulting shape of tensor C resulting from the multiplication of tensor A and tensor B is a 64×448 tensor. Tensor C outputted by loopnest 302 and indexed as C[j, i] has a resulting layout of [P, F] in which j indexes into the different partitions (P axis), and i indexes into different elements within a partition (F axis).

Turning now to loopnest 304, the first loop over iterator r1 is classified into a free axis (F), because the iterator r1 indexes into the data elements of a row partition as required by the pooling engine. Similarly, the second loop over iterator r2 is also classified into a free axis (F), because the iterator r2 also indexes into the data elements of a row partition as required by the pooling engine. Accordingly, tensor C inputted into loopnest 304 has a layout of [F, F] in which both r1 and r2 index into data elements within a row partition. A data layout conflict between two loopnests can be identified when the output tensor of one loopnest has a different set of axes that the input tensor of the other loopnest. In the example shown in FIG. 3A, the output tensor C of loopnest 302 is [P, F], which is different than the set of axes [F, F] of the input tensor C into loopnest 304. As such, a data layout conflict exists between loopnest 302 and loopnest 304.

FIG. 3B illustrates an example of resolving a data layout conflict. Two types of data layout manipulations can be performed to resolve data layout conflicts. The first type of data layout manipulation is an axis decay. An axis decay transforms either a partition axis or a free axis into a block axis. Hence, decaying an axis is akin to unrolling the iterations of a loopnest that were packed in an instruction into multiple instructions. Consider a single matrix multiplication having a [P, F] layout mapped into a PE array. Decaying the P axis into a B axis is akin to transforming the single matrix multiplication into a set of vector multiplications performed over the columns of the tensors. Decaying the F axis into a B axis is akin to transforming the single matrix multiplication into a set of vector multiplications performed over the rows of the tensors. Put another way, decaying a P or F axis into a B axis is equivalent to separating each iteration over the axis into an individual instruction.

The second type of data layout manipulation is a transpose operation. Depending on the implementation of the neural network accelerator, various transpose operations can be available. The transpose operations may include a partition-to-free axis transpose (PF transpose), a block-to-free axis transpose (BF transpose), or a direct memory access (DMA) copy transpose. In some implementations of the neural network accelerator, a partition-to-free axis transpose operation can be performed by multiplying a tensor with an identity matrix in the PE array. Such a partition-to-free axis transpose operation takes advantage of the coupling between the partial sum buffer and the state buffer to allow the row elements of a tensor to exchange position with the column elements of a tensor. Hence, the data elements across row partitions (partition axis) are transposed with data elements within a row partition (free axis). Such a partition-to-free axis transpose operation can be performed within the local memory of the neural network accelerator, and does not require copying data to system memory (e.g., DRAM).

A block-to-free axis transpose can be performed using a tensorcopy instruction to move tensor elements into the same row partition. Similar to the partition-to-free axis transpose, the block-to-free axis transpose can be performed within the local memory of the neural network accelerator, and does not require copying data to system memory (e.g., DRAM).

For other types of transposition of data elements that cannot be achieved using partition-to-free axis transpose or block-to-free axis transpose, a DMA copy transpose can be used. The DMA copy transpose can be used to copy tensor elements into system memory using DMA accesses, and then writing back the data elements into the local memory (e.g., state buffer) of the neural network accelerator. A DMA copy transpose can write back the data elements into any available location in the local memory, and thus provides a greater flexibility into how the tensor elements can be rearranged. However, accessing system memory can be costly in terms of the increase in compute latency and reduction in the available memory bandwidth for other operations.

Returning to FIG. 3B, one way to resolve the data layout conflict between loopnest 302 and loopnest 304 is to decay the axes of loopnest 302 from [P, F] into [B, F], and then inserting a block-to-free axis transpose to transpose the output of loopnest 302. To decay the axes of loopnest 302 from [P, F] into [B, F], the loop over iterator k can be decayed from the P axis into the B axis. According to the original axes of loopnest 302, the matrix multiplication operation of loopnest 302 will be unrolled into 100 instructions because of the loop over iterator b. After the axis decay, the matrix multiplication operation will be unrolled into 400 instructions because of the loop over iterator b, and the decay of iterator k into the B axis. Once the output tensor C of loopnest 302 has been transformed to a [B, F] data layout, the output tensor C can be rearranged using a block-to-free axis transpose operation (e.g., tensorcopy instruction), such that the pooling engine performing the reduce operation of loopnest 304 can access the tensor data elements.

It should be noted that there can be other ways of resolving the data layout conflict. The goal of the compiler is to select the most suitable solution to minimize the number of instructions, transpose operations, and DMA accesses for the compute flow given the hardware constraints. Transpose operations that can be performed using the local memory of the neural network accelerator are preferred over transpose operations that may require DMA accesses to system memory (e.g., DRAM). However, transpose operations using the local memory can be limited in terms of the size and shape of the tensor being transpose, as well as the source and destination locations of the tensor elements. An axis decay to unroll iterations into instructions may also be preferred over DMA accesses, depending on the instruction fetch latency and execution time as compared to the DMA access latency. It should also be noted that the most suitable solution to the same data layout conflict can be different for different hardware architectures.

Figure 4:
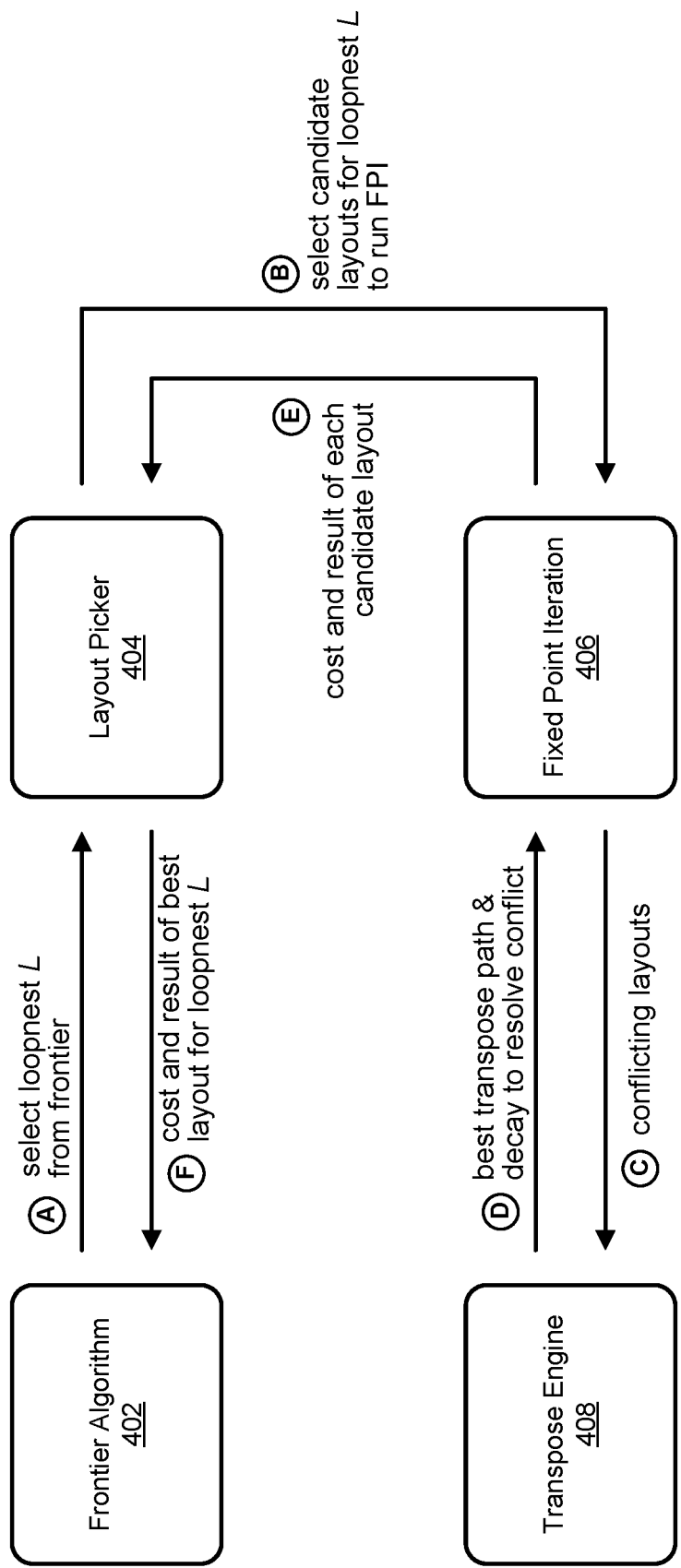
FIG. 4 illustrates an example of a data layout analysis framework.

FIG. 4 illustrates a data layout analysis framework according to the techniques disclosed herein. The data layout analysis framework includes a frontier algorithm 402, a layout picker 404, a fixed point iteration engine 406, and a transpose engine 408. The data layout analysis operates on an intermediate representation (IR) of the neural network. The IR inputted into the data layout analysis represents operators (e.g., computations) using loopnests. A representation of a compute flow graph can be generated from the IR with each loopnest being represented a node, and data dependencies between loopnests being represented by edges between the nodes (e.g., an edge indicates a sink node consuming a tensor produced by a source node).

The data layout analysis may begin by identifying connected components in the compute flow graph. A connected component refers to a cluster of nodes or loopnests that are connected with each other in the compute flow graph. Data layout convergence is performed for each connected component to derive a compatible data layout for the loopnests belonging to each connected component. Within a connected component, nodes or loopnests that are associated with operators having a fixed data layout are first identified.

An operator can be considered to have a fixed data layout if the operator has a certain layout restriction imposed by the hardware executing the operation. For example, such operators in certain implementations of the neural network accelerator may include matrix multiplication ([P, F]), gather/scatter ([B, F]), reduce by pooling (F), broadcast (F), etc. Because of their data layout restrictions, these operators can serve as a starting point to determine a suitable data layout for other operators in the connected component. It should be noted that although such operators are referred to as having a fixed data layout, a P axis or F axis of such data layouts can still be decayed into a B axis. The "fixed" part of the data layout refers to the P axis and F axis not being interchangeable. In other words, for a fixed data layout, a P axis can be a P axis or be decayed into a B axis but not a F axis, and a F axis can be a F axis or be decayed into a B axis but not a P axis.

The nodes with fixed data layout are initialized into layout groups. Data layout conflicts between the loopnests of the nodes in the initial layout groups can be resolved using fixed point iteration to find a compatible data layout for each layout group. During the fixed point iteration, the P axis and/or F axis of a loopnest can be decayed into a B axis. When the data layout of a loopnest is updated, the update is propagated to the consumer and producer nodes or loopnests. Transpose operations can also be inserted to bridge layout conflicts. This process is iteratively performed until data layout convergence is reached in each initial layout group. Although this initialization is not explicitly shown in FIG. 4, convergence of the initial layout groups can utilize the same fixed point iteration engine 406 and transpose engine 408 used in the latter stages of the data layout analysis.

Once the initial layout groups have been established, frontier algorithm 402 can be invoked to select the next node or loopnest to initialize. The frontier algorithm 402 may only consider nodes or loopnests that are adjacent to the initial layout groups. These nodes or loopnests that are adjacent to an already initialized layout group are referred to as frontier nodes or frontier loopnests. Nodes or loopnests that are not directly connected to an initial layout group may not be considered. Within the set of frontier nodes, frontier algorithm 402 selects a frontier node or loopnest to process at operation A, and provides the selected loopnest to layout picker 404. Layout picker 404 enumerates all possible layout candidates for the selected loopnest. The possible layout candidates for a loopnest can include different permutations of placing each loop iterator of the loopnest on the P axis or on the F axis. If the number of possible layout candidates is below a threshold, then all possible layout candidates can be selected for further analysis. If the number of possible layout candidates is greater than the threshold, layout picker 404 may select a subset of the most promising layout candidates from all possible layout candidates to run fixed point iteration. In some implementations, the threshold can be a configurable compiler option. The selection of the most promising layout candidates can be performed using an estimator to prioritize layout candidates that match most closely with the layouts of producer/consumer loopnests (e.g., candidates having the exact same layout as producer/consumer, or be able to transpose from producer/consumer without decaying). In some implementations, the number of layout candidates being selected can depend on the complexity of the connected component (e.g., the number of nodes, number of edges between the nodes, number of layout possibilities for each node). Fewer candidates can be selected for more complex compute flow graphs, and more candidate can be selected for less complex compute flow graphs. This can prevent long compilations times due to long fixed point iteration runs for complex flows while allow a greater number of candidates to be explored for simpler flows. The selected layout candidates are then provided to fixed point iteration engine 406 at operation B.

For each layout candidate being considered for the loopnest being processed, fixed point iteration engine provides the conflicting data layouts (if any) between the layout candidate and the adjacent initialized nodes to transpose engine 408 at operation C. Transpose engine 408 then provides the best transpose path and any axis decay to resolve the data layout conflict back to fixed point iteration engine 406 at operation D. Transpose engine 406 can select the best transpose path by considering the instruction count due to axis decay and/or the number and type of transpose operation that can be used to resolve the layout conflict. For example, for a [P, F] to [F, F] conflict, six solutions are possible:

| Original: | [P, F] | [F, F] | |
|---|---|---|---|
| Solution 1: | Decay [P, F] → [B, F] | Decay [F, F] → [B, F] | No transpose |
| Solution 2: | Decay [P, F] → [P, B] | Decay [F, F] → [F, B] | PF transpose |
| Solution 3: | Decay [P, F] → [B, F] | No decay | BF transpose |
| Solution 4: | Decay [P, F] → [P, B] | No decay | PF transpose + BF transpose |
| Solution 5: | No decay | Decay [F, F] → [F, B] | BF transpose + PF transpose |
| Solution 6: | No decay | No decay | DMA copy transpose |

The best transpose path selected by transpose engine 406 to resolve the layout conflict can be the solution that has the least increase in instructions and the least transpose insertion. It should also be noted that PF transpose and BF transpose are preferred over DMA copy transpose because of the costly system memory accesses.

Fixed point iteration engine 406 then propagates the candidate layout to the consumer and producer nodes, and determines the cost of the candidate layout. The cost of a candidate layout for a loopnest can be a function of an instruction count, a transpose count, and a DMA count associated with implementing the candidate layout. Fixed point iteration engine 406 performs the cost assessment for each of the selected candidate layout, and provides the cost of the selected candidate layouts to layout picker 404 at operation E. Layout picker 404 then selects the lowest cost candidate, and provides the lowest cost and associated data layout solution to frontier algorithm 402 at operation F.

Frontier algorithm 402 uses this lowest cost to derive the initialization cost of the frontier node being processed. In addition to the attributes mentioned above for the cost of a candidate layout (e.g., instruction count, transpose count, and DMA count), the initialization cost of a frontier node also takes into account a measurement of the prior information known about the frontier node. For example, a metric can be used to assess the amount of prior information known about the frontier node. This metric may include number of undecided axes in the loopnest of the frontier node that is not fixed to be any specific axis (P, F, or B), and/or the number of instructions in the frontier node that are not adjacent to any initialized node. Having lower numbers for these attributes means more prior information is known about the frontier node and thus a lower initialization cost. The initialization cost of each frontier node is determined in a similar manner.

Once the initialization cost of every frontier node has been determined, the frontier node with the lowest initialization cost is selected for initialization and is merged with the adjacent layout group to form a new layout group. If the frontier node bridges between two or more adjacent layout groups, all adjacent layout groups are merged with the frontier node to form a new layout group. Data layout convergence is performed in the new layout group to provide a compatible data layout for the loopnests in the layout group. A layout group is said to have a compatible data layout when the data layouts (including any axis decays), and any transpose operation to bridge the data layouts of the tensors of the layout group have been identified. Upon creating a new layout group, any new frontier nodes are identified. The initialization costs of the new frontier nodes are determined, and the initialization costs of the existing frontier nodes that were not selected for merging are updated. The process described above is repeated to merge another frontier node until all nodes in the connected component are merged into a single layout group. data layouts and transpose operations identified for the loopnests of the connected component are then used in conjunction with the IR to generate machine instructions for the neural network.

Figure 5A:
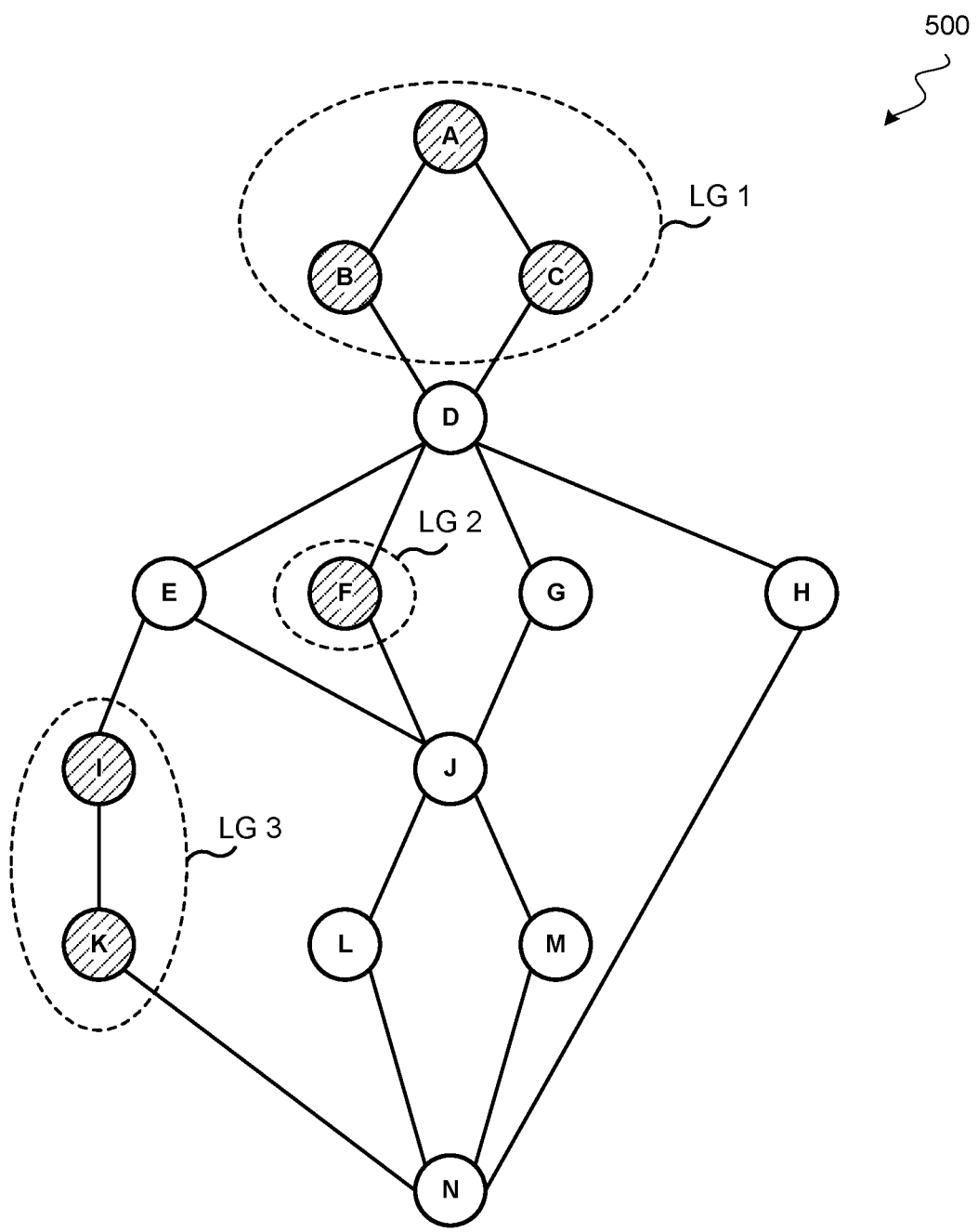
FIGS. 5A to 5G illustrate the progression of an example of achieving a compatible data layout for a connected component.

FIGS. 5A-5G illustrates an example of a connected component 500 and the progression of performing a frontier-based data layout analysis on connected component 500. Referring to FIG. 5A, connected component 500 includes a cluster of nodes (node A to node N) that are connected with each other. Connected component 500 can be one of many connected components in a larger compute flow graph. Each of node A to node N represents a loopnest. Each loopnest may represent an operator that performs a certain neural network computation. An edge connect two nodes indicate a data dependency between the two nodes. For example, the edge between node A and node B indicates that node B consumes the tensor produced by node A.

The data layout analysis may begin by identify nodes that are associated with operators having a fixed data layout imposed by the hardware architecture executing the neural network. Such nodes may include operators such as matrix multiplications, gather, scatter, etc. These nodes are filled with a diagonal pattern in FIG. 5A, and include nodes A, B, C, F, I, and K. Nodes that are connected with each other are grouped into an initial layout group. Thus, nodes A, B. and C are initialized into layout group LG1, node F is initialized into its own layout group LG2, and nodes I and K are initialized into layout group LG3. For each of the initial layout groups, fixed point iteration can be performed to resolve layout conflicts amongst the loopnests within the layout group.

Figure 5B:
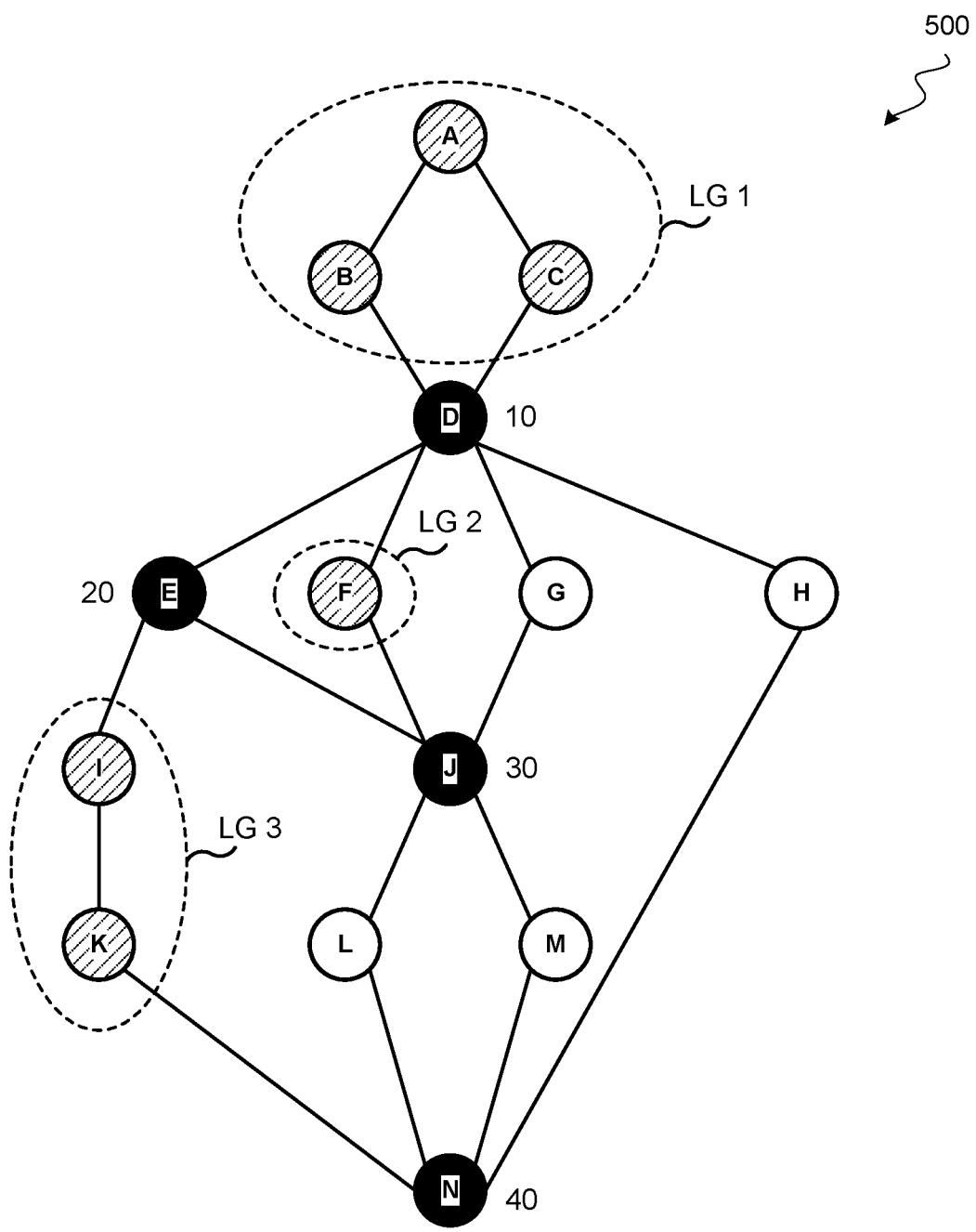
Figure 5C:
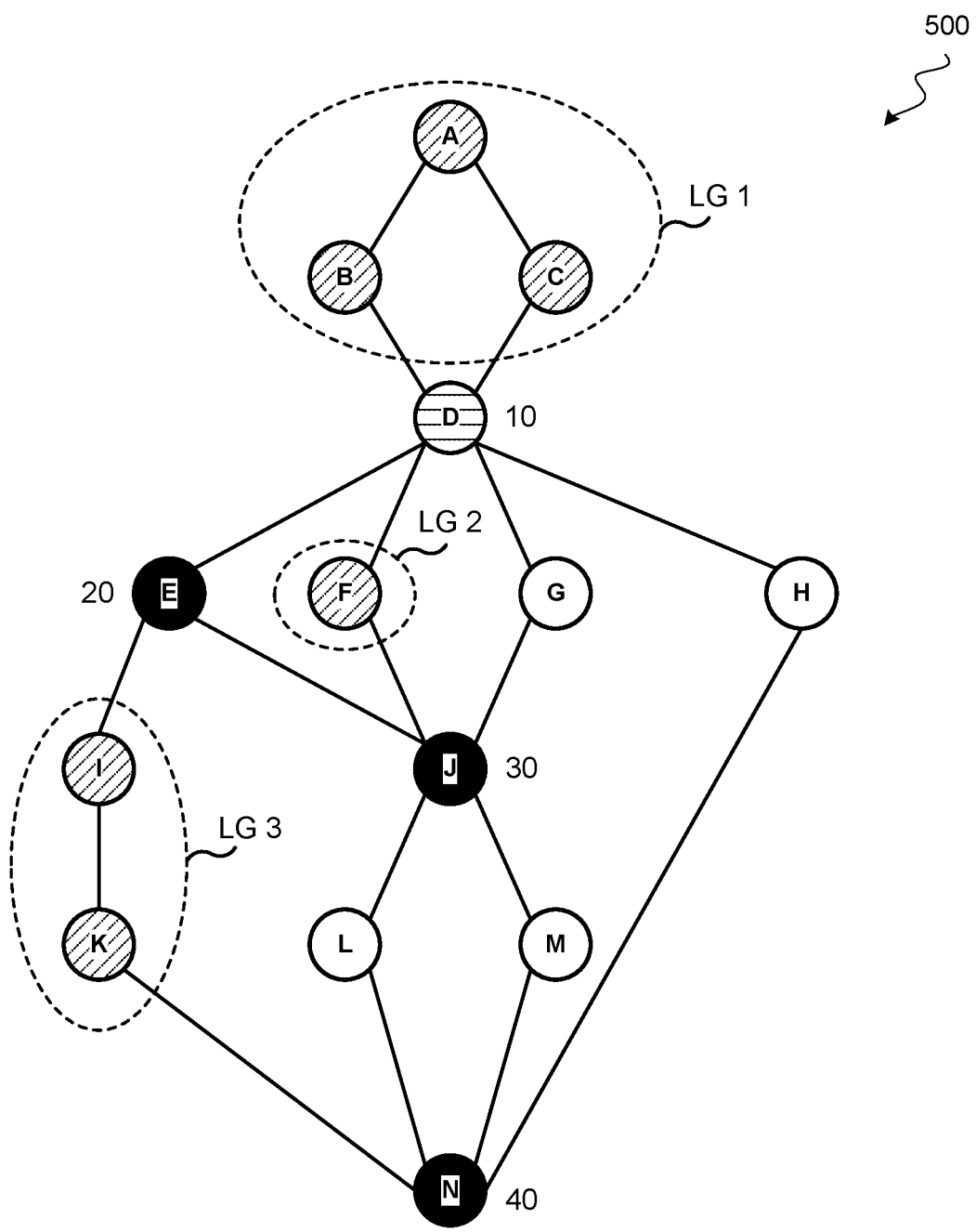

Next, a set of frontier nodes adjacent to the initial layout groups are identified. The frontier nodes are nodes that are directly connected to a layout group. Referring to FIG. 5B, node D is adjacent to both layout groups LG1 and LG2, nodes E and N are each adjacent to layout group LG3, and node J is adjacent to layout group LG2. Hence, the set of frontier nodes includes nodes D, E, J, and N, which are shaded in grey. An initialization cost is then determined for each of the frontier nodes.

For example, for a particular frontier node, a set of layout candidates can be determined for the frontier node. Each layout candidate can be a permutation of classifying a loop iterator in the loopnest of the frontier node as a F axis or as a P axis. The optimal transport path is determined for each layout candidate, and the cost of each layout candidate according to the optimal transpose path is determined. The transpose path and layout candidate having the lowest cost is selected, and this lowest cost of the layout candidates can be used to derive the initialization cost of the frontier node. This initialization cost of the frontier node can be based on the amount of prior information known about the frontier node (e.g., inverse relationship with the number of undecided axes in the loopnest and the number of instructions that are not adjacent to any initialized node), an instruction count, a transpose count, and a direct memory access (DMA) count associated with the frontier node.

Referring to FIG. 5B, the initialization cost of node B can be represented as 10, the initialization cost of node E can be represented as 20, the initialization cost of node J can be represented as 30, and the initialization cost of node N can be represented as 40. Although a numeric value is used to represent the cost associated with each frontier node, it should be understood that the cost can be represented using a prioritized list of attributes instead of a numeric value. For example, the attributes may include the amount of prior information known about the frontier node, the instruction count, the transpose count, and the direct memory access (DMA) count associated with the frontier node. The amount of prior information known about the frontier node can be given the highest priority. In some scenarios, frontier nodes having the most initialized adjacent nodes may correlate to having the lowest initialization cost. This is reflected in FIG. 5B by node D having the lowest initialization cost given that node D has the most initialized adjacent nodes (3 nodes).

Figure 5D:
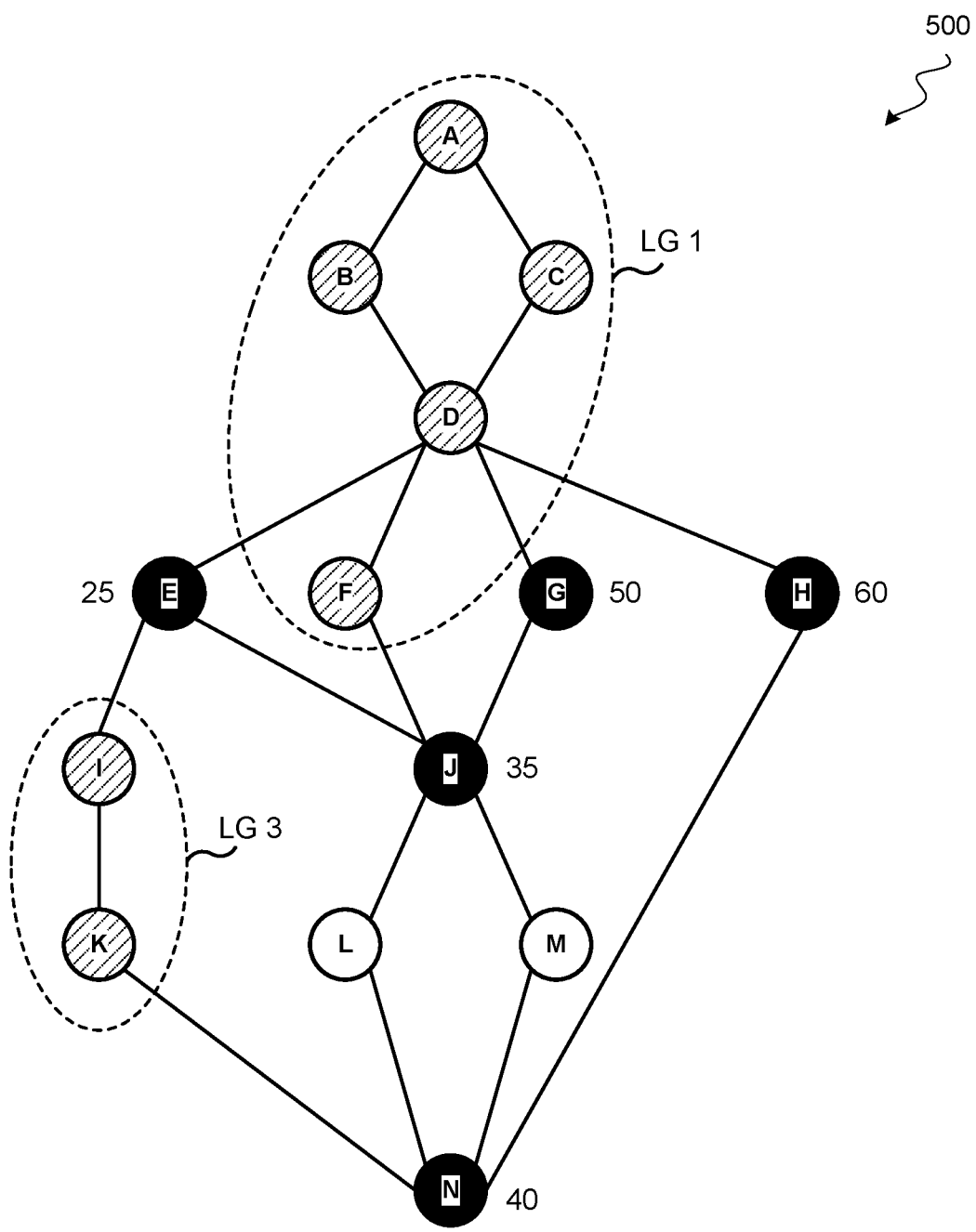

Next, the frontier node with the lowest initialization cost is selected and merged with the layout groups adjacent to the frontier node to form a new or updated layout group. As mentioned above, node D has the lowest initialization cost, and thus node D is selected and merging in FIG. 5C, as shown with the horizontal fill pattern. Node D is then merged with its adjacent layout groups LG1 and LG2 as shown in FIG. 5D. When node D is merger with the adjacent layout groups, the loopnest of node D is assigned a data layout along with any transpose operation such that node D will have a compatible data layout with the other nodes in new layout group LG1.

By forming a new layout group, new frontier nodes G and H emerges, and the initialization costs for these new frontier nodes are determined. In some scenarios, the initialization cost of the already existing frontier nodes may change due to the layout changes in adjacent nodes. Hence, the initialization costs of pre-existing frontier nodes can be adjusted as needed.

Figure 5E:
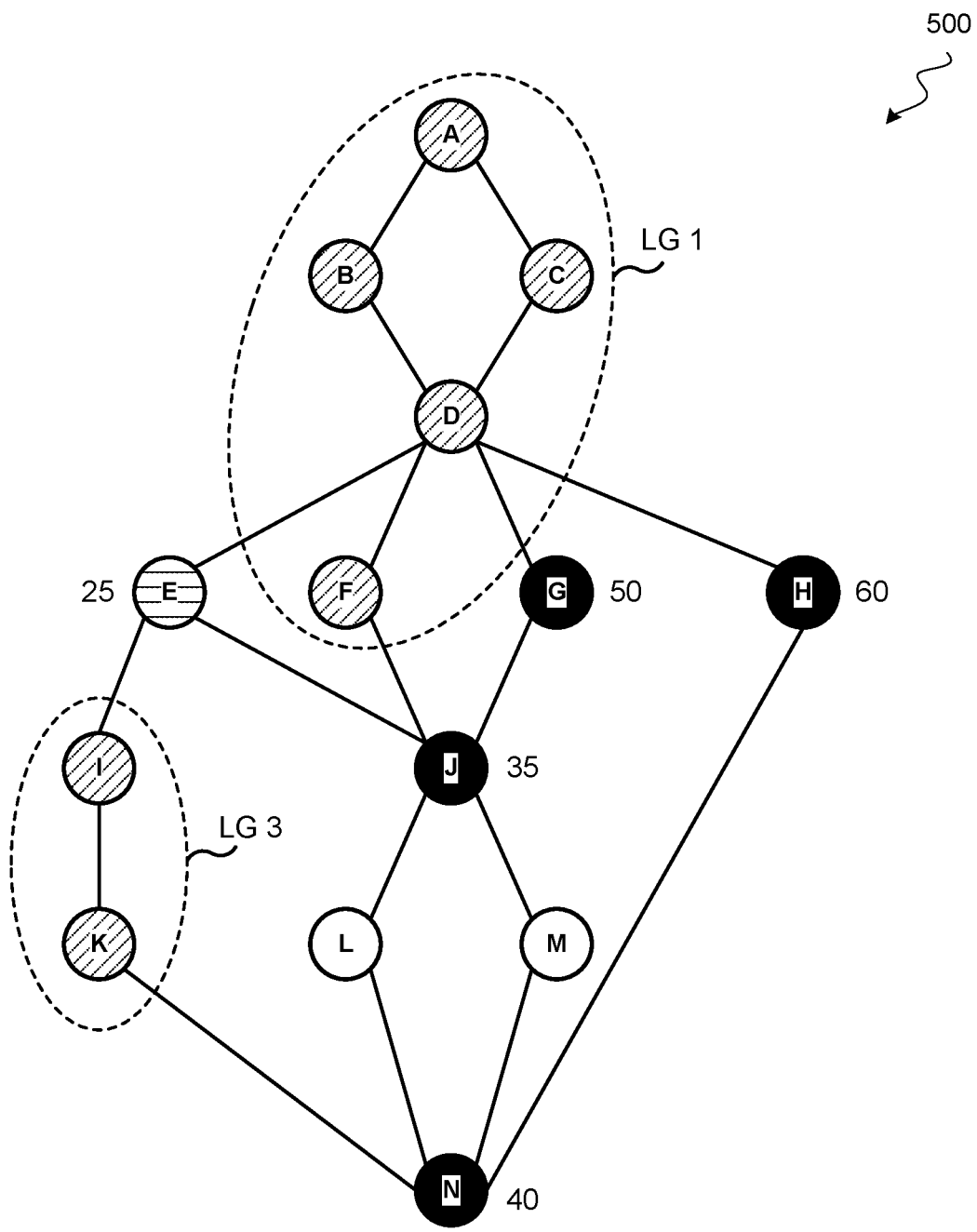
Figure 5F:
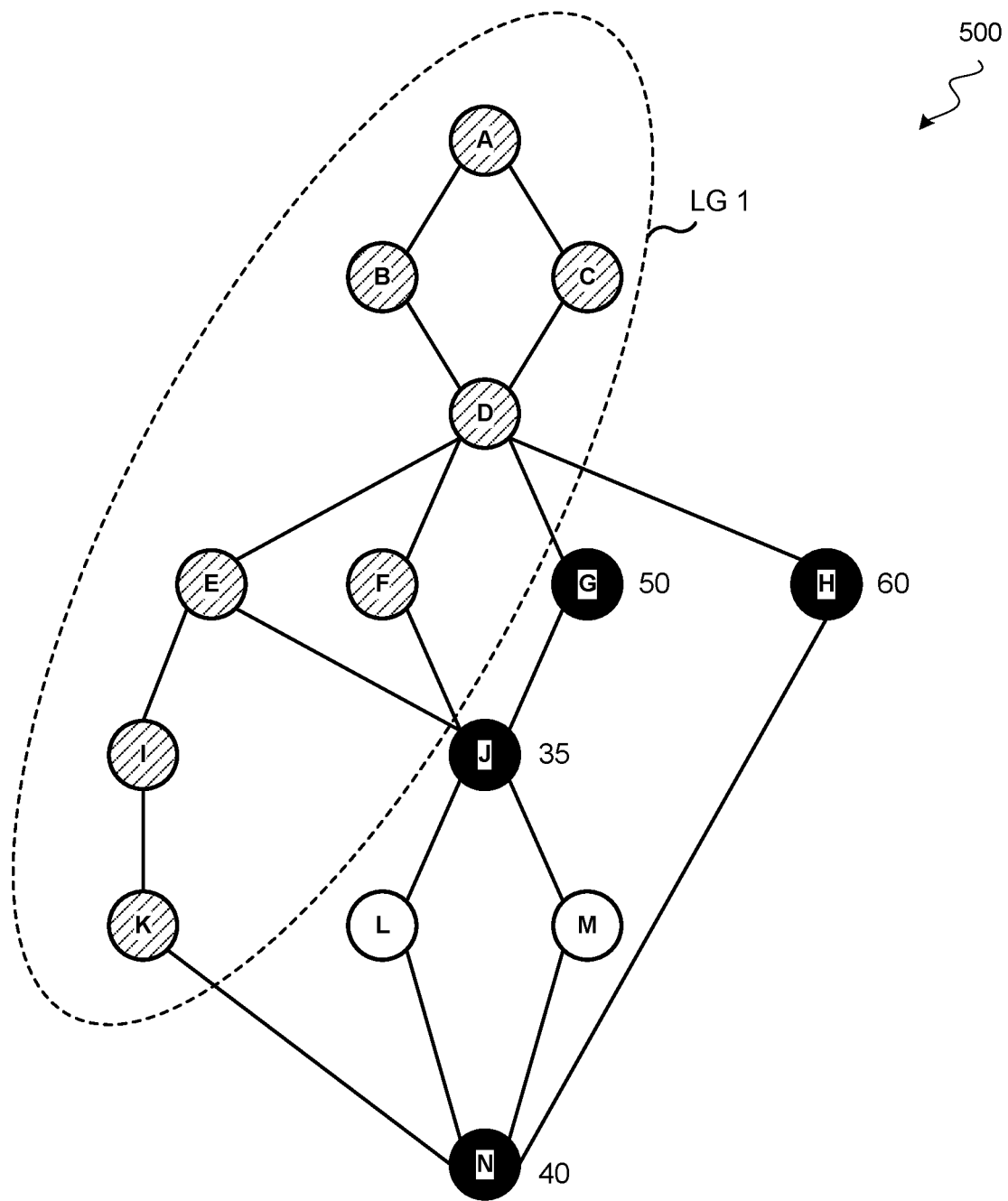
Figure 5G:
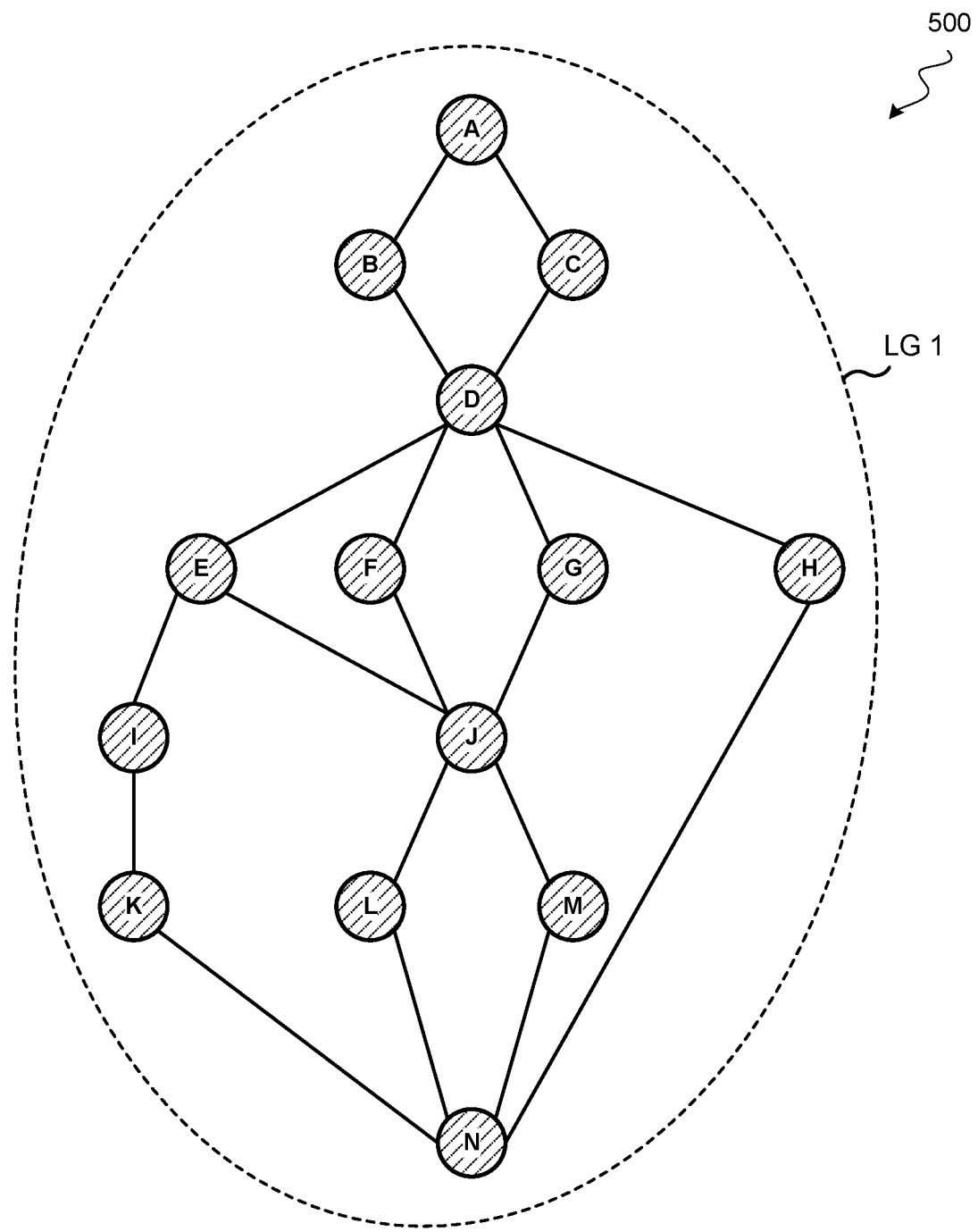

The process then repeats by selecting the frontier node with the lowest initialization cost in the current set of frontier nodes. Referring to FIG. 5E, node E has the lowest initialization cost in the current set of frontier nodes. Hence, node E is selected for merging, as indicated by the horizontal fill pattern. Referring to FIG. 5F, node E is merged with it two adjacent layout groups LG1 and LG2 to form a new or updated layout group LG1, and the loopnest of node E is assigned a data layout along with any transpose operation such that node E will have a compatible data layout with the other nodes in new layout group LG1. This process of selecting the frontier node with the lowest initialization for merging is repeated until the entire connected component 500 forms a single layout group having a compatible data layout as shown in FIG. 5G.

Figure 6:
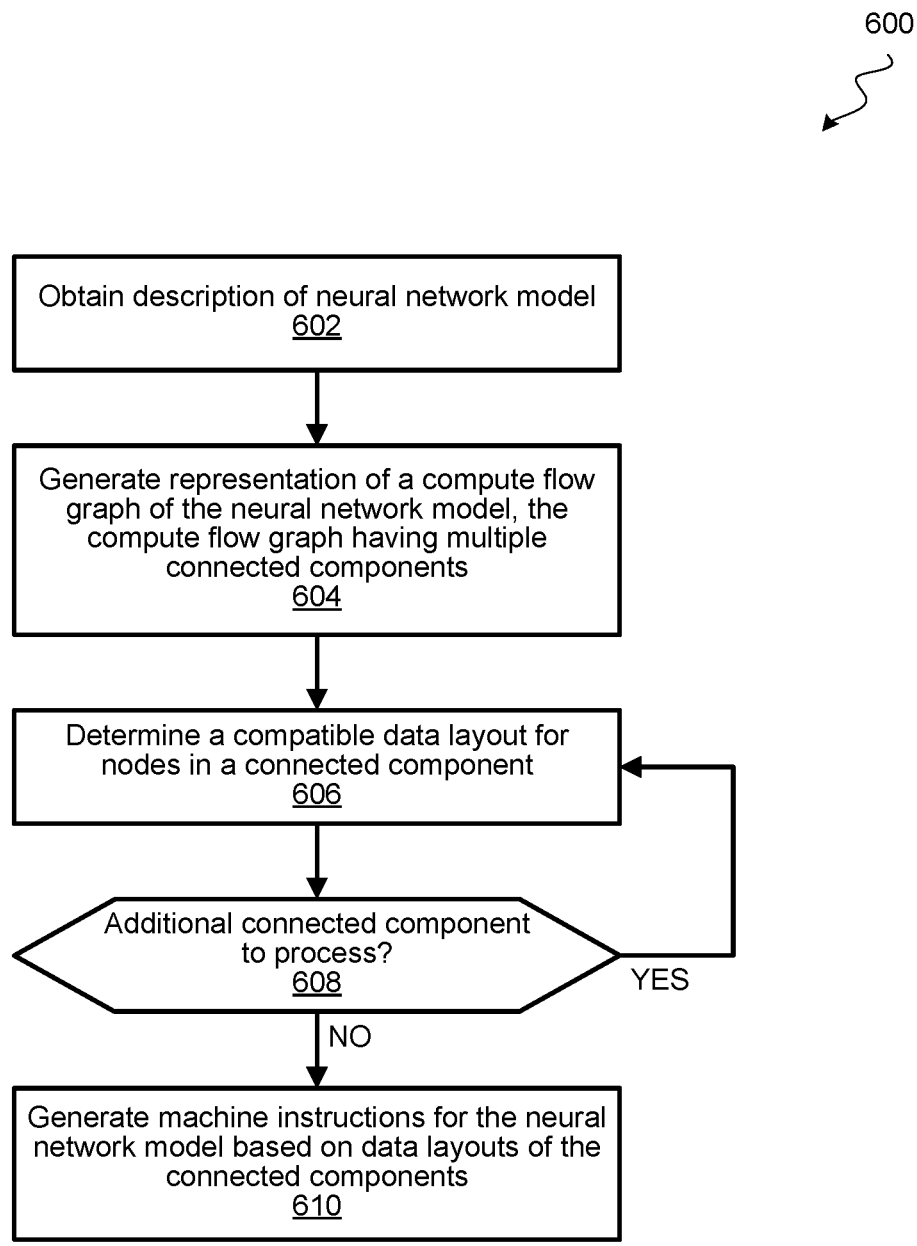
FIG. 6 illustrates a flow diagram of an example of a process for compiling a neural network model.

FIG. 6 illustrates a flow diagram of an example of a process 600 for compiling a neural network model. Process 600 can be performed, for example, by a compiler that interprets programming code describing the neural network model, and translates the programming code into machine instructions for execution on hardware (e.g., an integrated circuit device such as a neural network accelerator or an acceleration engine). In some implementations, process 600 can be implemented on a computer-readable medium that is executable by one or more processors of a computing system to compile the programming code of a neural network model for loading onto the integrated circuit device for execution.

Process 600 may begin by obtaining a description of a neural network model at block 602. The description of the neural network model can be, for example, source code written in a high-level programming language, such as Python, Java, C++, among other examples. In some implementations, the description of the neural network model may utilize software libraries tailored for neural networks such as TensorFlow, PyTorch, etc. In some implementations, the description of the neural network model can be obtained from the local storage of the computing system executing the compiler, or from a remote storage over a network interface. A file name or a reference to the description of the neural network model can be provided with a command to invoke the compiler, or can be loaded into the compiler via a user interface.

At block 604, a representation of a compute flow graph of the neural network model is generated. The compute flow graph can be generated, for example, by generating an intermediate representation (IR) from the description of a neural network model (source code), and expanding operators in the IR into loopnests. The compute flow graph may include one or more connected components, in which each connected component has a set of connected nodes representing loopnests in the neural network model, and the edges between the nodes representing data dependencies between the loopnests (e.g., a loopnest consuming a tensor produced by another loopnest). The connected components can be separated by nodes that do not have data dependencies with the connected components, or by nodes that do not include loopnests.

At block 606, a compatible data layout is determined for the nodes in a connected component. A compatible data layout for a connected component can be achieved when a suitable data layout is assigned to each of the loopnests in the connected component and any transpose operation needed to bridge data layout conflicts have been inserted. Determining a compatible data layout may include initializing nodes in the connected component that are associated with operators having a fixed data layout into an initial set of one or more layout groups, and iteratively merging a frontier node that has a lowest initialization cost with one or more layout groups adjacent to the frontier node until all the nodes in the connected component are merged into a final data layout group having a compatible data layout. Merging the frontier node may include resolving data layout conflicts between loopnests having different data layouts by performing one or more of decaying an iteration axis or inserting a transpose operation (e.g., using fixed point iteration). In some implementations, an initialization cost of the frontier node is determined based on a prioritized list of attributes including the amount of prior information known about the frontier node, an instruction count, a transpose count (e.g., transpose without accessing system memory), and a direct memory access (DMA) count associated with the frontier node. The amount of prior information known about the frontier node can be given the highest priority in the prioritized list of attributes to implement a prior information-based preference for merging the nodes.

At block 608, a determination is made as to whether there are addition connected components to process in the compute flow graph of the neural network model. If there is an additional connected component that has not yet been processed, then process 600 can return to block 606 to process the additional connected component. If each of the connected components has a corresponding compatible data layout in the compute flow graph, process 600 can proceed to block 610.

At block 610, machine instructions for executing the neural network model on an integrated circuit device can be generated based on the data layouts of the connected components determined from block 606. For example, machine instructions can be derived from the loopnests and scheduled by a scheduler. Memory allocation for a state buffer that loads data into a PE array can be performed based on the data layout assignments. The generated machine instructions can be in the form of compiled code in a binary format that can be loaded onto the integrated circuit device for execution.

Figure 7:
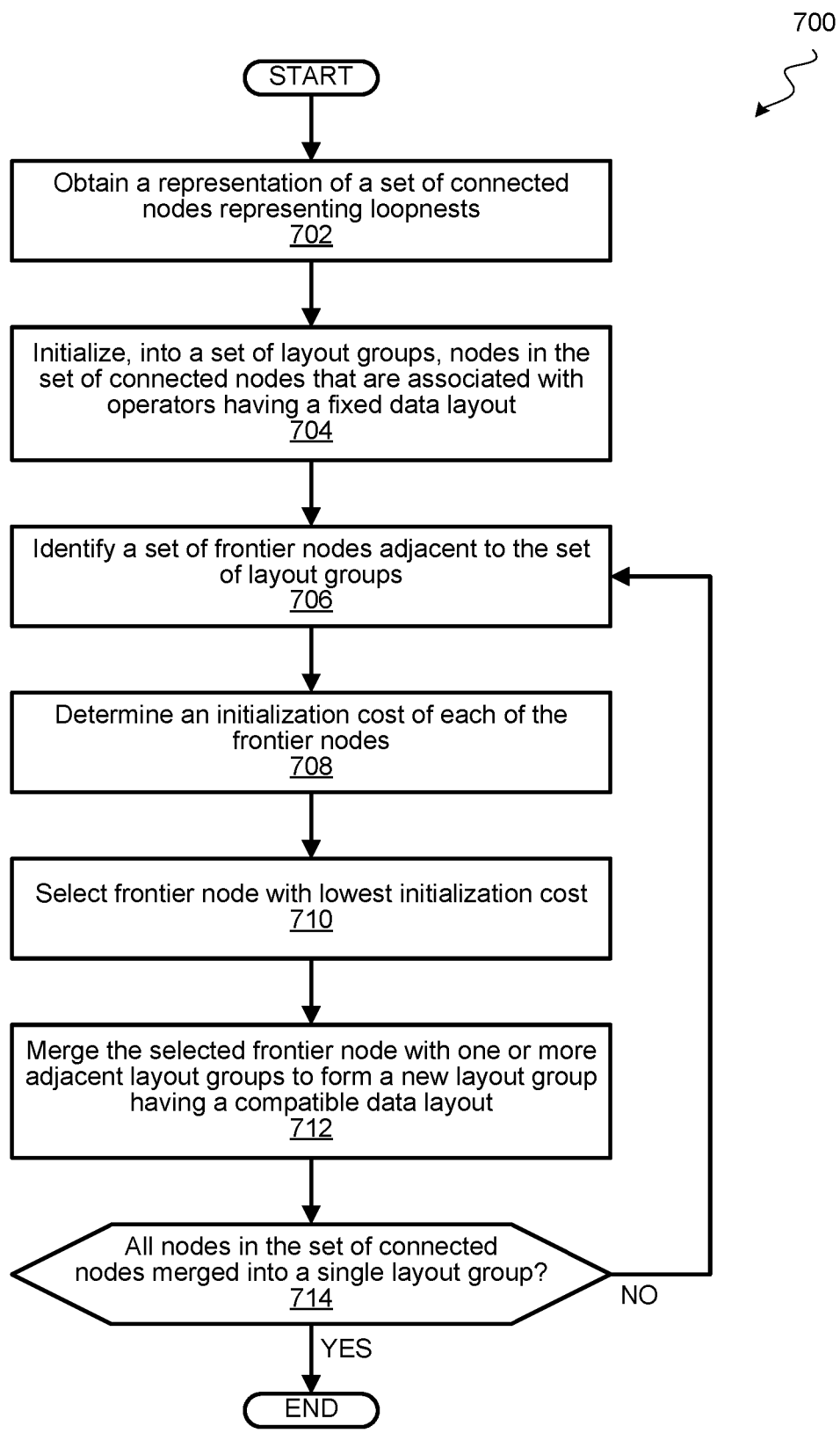
FIG. 7 illustrates a flow diagram of an example of a process for data layout analysis.

FIG. 7 illustrates a flow diagram of an example of a process 700 for determining a compatible data layout for a connected component. Process 700 can be performed, for example, by a compiler that interprets programming code describing the neural network model, and translates the programming code into machine instructions for execution on hardware (e.g., an integrated circuit device such as a neural network accelerator or an acceleration engine). In some implementations, process 700 can be implemented on a computer-readable medium that is executable by one or more processors of a computing system to compile the programming code of a neural network model for loading onto the integrated circuit device for execution. Process 700 can be performed as part of block 606 in process 600.

Process 702 may begin at block 702 by obtaining a representation of a set of connected nodes (e.g., a connected component) representing loopnests in a compute flow graph. In some implementations, the compute flow graph may represent the computational flow of a neural network model. Each loopnest may include a number of loop statements, and each statement may include an iterator variable. A loopnest may represent a certain operator involving a computation in the neural network model. The nodes in the set of connected nodes are analyzed to derive a compatible data layout for the set of connected nodes.

At block 704, nodes in the set of connected nodes that are associated with operators having a fixed data layout are initialized into a set of layout groups. For example, adjacent nodes that are associated with such fixed data layout can be grouped together into a layout group. Depending on the hardware architecture of the integrated circuit device executing the neural network mode, operators that are considered to have a fixed data layout may include matrix multiplication operators, gather operators, scatter operators, etc. More generally, an operator is considered to have a fixed data layout if the hardware imposes certain data layout or arrangement of the data in memory for the computation performed by the operator. Initializing such nodes into layout groups may also including converging the nodes in each layout group by resolving data layout conflicts between adjacent loopnests having different data layouts.

Resolving a data layout conflict may involve, for example, classifying each iterator in the loopnests into one of a free axis, a partition axis, or a block axis, and performing an axis decay or inserting a transpose operation (e.g., using fixed point iteration) to resolve the data layout conflict. The axis decay may include decaying a partition axis to a block axis, or decaying a free axis to a block axis. When an axis is decayed, the axis decay can also be propagated to adjacent nodes. Examples of transpose operations to bridge different layouts may include a partition-to-free axis (PF) transpose, a block-to-free (BF) axis transpose, or a direct memory access (DMA) copy transpose. In some implementations, PF and BF transposes can be performed without copying data into system memory (DRAM), and may be preferred over DMA copy transpose.

At block 706, a set of frontier nodes adjacent to the set of layout groups are identified. At this point, only nodes that are adjacent (e.g., directly connected) to the layout groups are considered for merging with the layout groups. Only these frontier nodes may be considered because these are the nodes for which prior information (e.g., data layouts of producers/consumers) is available.

At block 708, an initialization cost of each of the frontier nodes is determined. The initialization code of a frontier node can be determined, for example, by determining a set of layout candidates for the frontier node, selecting an optimal transpose path for each of the layout candidate, and determining a cost for each layout candidate based on the optimal transpose path for the layout candidate. The layout candidate having the lowest cost can be selected, and this lowest cost can be used as the initialization cost of the frontier node.

In some implementations, determining the set of layout candidates may include selecting a number of candidates from possible layout candidates for the frontier node using an estimator. The number of possible layout candidates for a frontier node is dependent on the number of loops or iterators in the loopnest of the frontier node. Each iterator can be assigned to the P axis (placed across row partitions) or to the F axis (placed across elements within a row partition). Hence, the number of possible candidates can be $2^n$, where n is the number of loop statements or number of iterators in the loopnest. To prevent long compile times, a number of the most promising layout candidates can be selected for further analysis (e.g., using fixed point iteration). The number of layout candidates selected can be based on a complexity of the set of connected nodes. For more complex compute flow graphs, fewer layout candidates may be explored; whereas for simpler complex compute flow graphs, more layout candidates can be explored.

For each of the selected layout candidate for the frontier node, an optimal transpose path can be determined, and a cost of the layout candidate is determined. The cost can be based on the instruction count, the transpose count, and the direct memory access (DMA) count associated for the layout candidate implementing the optimal transpose path. The lowest cost layout candidate is then selected for the frontier node, and an initiation cost is derived for the frontier node based on the cost of the layout candidate. In addition to the instruction count, transpose count, and direct memory access (DMA) count, the initialization cost of the frontier node also includes a metric measuring the amount of prior information known about the frontier node. This metric may include number of undecided axes in the loopnest of the frontier node that is not fixed to be any specific axis (P, F, or B), and the number of instructions in the frontier node that are not adjacent to any initialized node. The lower these numbers are, the more prior information is known about the frontier node and thus yielding a lower initialization cost.

At block 710, once the initialization cost for all frontier nodes have been determined, the frontier node with the lowest initialization cost is selected. At block 712, the selected frontier node is merged with one or more adjacent layout groups to form a new layout group having a compatible data layout. The selected layout candidate for the frontier node being merged can be used as the data layout for the frontier node. The compatible data layout for the new layout group can be determined by resolving data layout conflicts between the nodes as described above.

At block 714, a determination is made as to whether all nodes in the set of connected nodes have been merged into a single layout group. If there are remaining nodes that have not been merged, process 700 may return to block 706. The operations of block 706, 708, 710, and 712 can be iteratively performed until all the nodes of the set of connected nodes are merged into a single layout group. The compatible data layout determined for the set of connected nodes (e.g., connected component) can then be used by the subsequent compilation steps to allocate memory for the various tensors produced and consumed by the loopnests.

Process 700 can be used to minimize instruction count, minimize transpose calculation, maximize tensor size for operators such as matrix multiplication, and avoid slow access to the system memory by putting tensors in the on-chip buffer memory. By implementing the data analysis technique of process 700, compute latency can be reduced, throughput can be improved, and compile time of deep learning graphs can also be reduced.

Although the data layout techniques of the present disclosure have been described in the context of executing a neural network model in a neural network accelerator, the data layout techniques can also be used with other types of workload in other types of integrated circuit devices. For example, other types of computation circuitry such as graphic processing units (GPUs) or digital signal processors (DSPs) that can concurrently load data from multiple partitions of memory, and/or share a memory with multiple compute engines can benefit from data layout selections that minimize the number of instructions, transposes, and system memory accesses. Hence, the data layout techniques as described herein can also be implemented in compilers for other types of integrated circuit devices.

Figure 8:
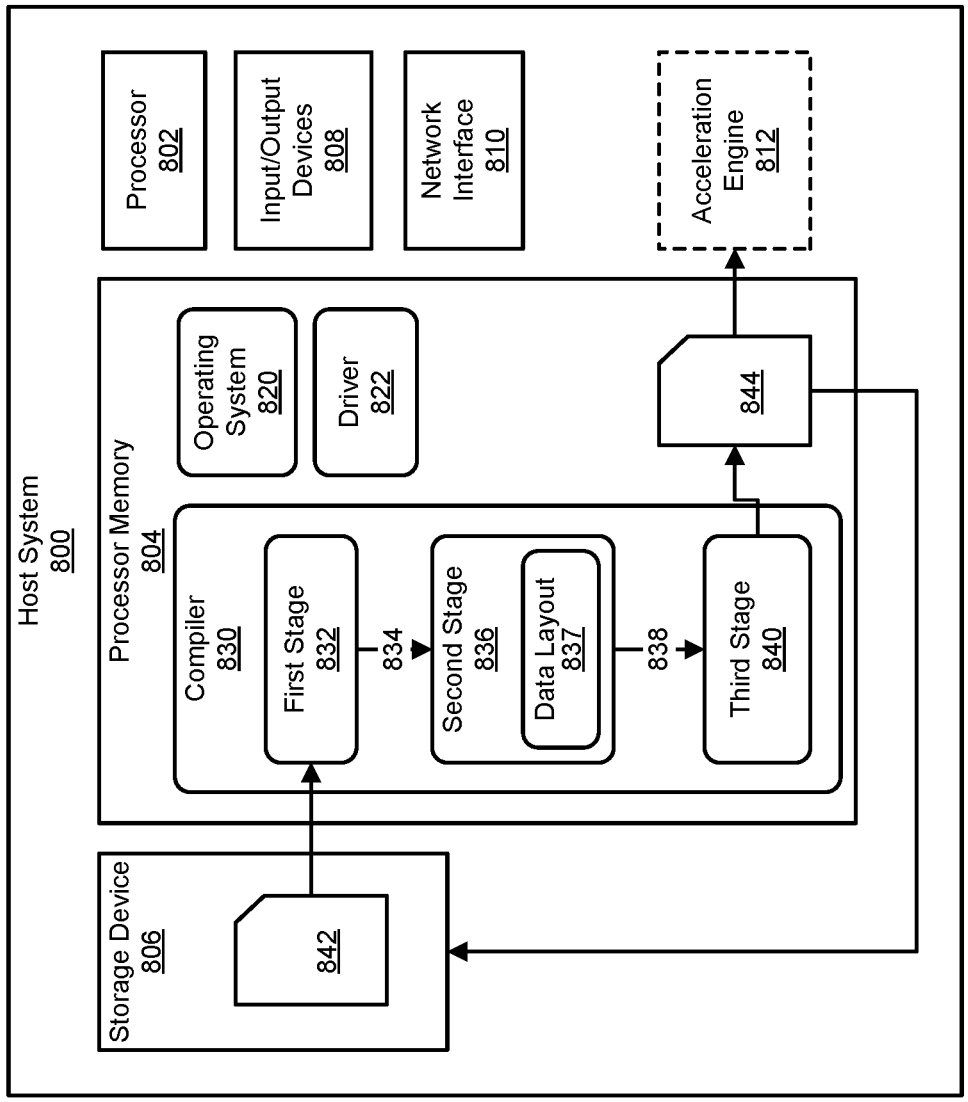
FIG. 8 illustrates a block diagram of an example of a compiler in a host system.

FIG. 8 illustrates a block diagram of an example of a host system 800 on which a compiler 830 can run. The illustrated host system 800 is an example of a computing device, and includes a processor 802, a processor memory 804, at least one storage device 806, various Input/Output (I/O) devices 808, and at least one network interface 810. In the example of FIG. 8, the host system 800 also includes an acceleration engine 812, which is an integrated circuit device that can accelerate certain operations or computations performed by the host system 800. In various examples, the host system 800 can be implemented as a server in a data center, a desktop computer, a laptop computer, a tablet computer, or a smartphone, among other examples. In some examples, operations or components discussed below as being performed or included in the host system 800 can be performed or included in other computer devices. For example, the compiler 830 can execute on the host system 800 while the acceleration engine 812 is located in a different host system or different computing device.

The processor 802 is an integrated circuit device that can execute program code, in the form of instructions. The program code can be for various software applications or tools, such as an operating system 820 or the illustrated compiler 830. While the processor 802 is executing a program, the instructions for the program can be stored in the processor memory 804. The instructions can also be stored elsewhere, such as on the storage device 806, and can be loaded into the processor memory 804 when needed by the processor 802. The processor 802 can also use the processor memory 804 for temporary storage of other data that the processor 802 is operating on. In various examples, the processor memory 804 is a volatile memory type, such as a type of random access memory, though non-volatile memory types can, alternatively or additionally, be used for the processor memory 804.

The storage device 806 is an example of a device that can include non-volatile memory. For example, the storage device 806 can be a magnetic disk drive, a solid-state drive, or an optical drive, among other examples. Program code and other data stored on the storage device 806 can remain present when the storage device 806 is not powered on. Storage device 806 can be uses as a type of non-transitory storage medium, or may include a reader that can access non-transitory storage medium.

The storage device 806 is one example of a peripheral device. A peripheral device is a component that can be coupled to the host system 800 to add functionality to the host system 800. Other examples of peripheral devices include Input/Output devices 808 and network interface 810. The Input/Output devices 808 can include user input and/or output devices, such as keyboard, mouse, pointer, touchpad, touchscreen, microphone, display screen, speaker, printer, and scanner, among other examples. Network interface 810, which can be implemented using a network interface card, can provide access to one or more networks. Network interface 810 can include, for example, a physical port for connecting a network cable and/or one or more antennas and/or radios for wireless communication such as Wi-Fi, cellular, and/or other over-the-air networks. Network interface 810 can also be described as an I/O device.

The acceleration engine 812 is also another type of peripheral device or I/O device. The acceleration engine 812 is a device that is purpose-built to perform certain operations that can be performed by the processor 802, but can be performed faster by the acceleration engine 812. For example, the acceleration engine 812 can be a neural network accelerator that is capable of performing large scale, parallel computations of a neural network more efficiently than when the computations are performed by the processor 802. As another example, the acceleration engine 812 can be a graphics processing unit (GPU), and may be optimized to perform the computations needed for graphics rendering. Other examples of devices that can be implemented by the acceleration engine 812 include cryptographic accelerators, compression and decompression accelerators, 3-D accelerators, regular expression accelerators, security accelerators, and others.

In various examples, the acceleration engine 812 can execute program code to perform certain operations. For example, when the acceleration engine 812 is a neural network accelerator, the acceleration engine 812 can be programmed to execute a particular neural network model, such as one that performs image recognition or one that performs machine translation. As a further example, to support the execution of a neural network model, the acceleration engine 812 can be programed to perform operations such as copying data for the neural network between processor memory 804 and the acceleration engine 812 (e.g., copying input data for the neural network from processor memory 804 into the acceleration engine 812, copying results from the acceleration engine 812 into the processor memory 804, etc.).

To generate program code for the acceleration engine 812, the host system 800 can execute the compiler 830. Compilers, in general, are software programs that translate program code written in a human-readable language into a format (e.g., machine instructions) that can be read and processed by an integrated circuit device. In the example of FIG. 8, the acceleration engine 812 can be a neural network accelerator, and the compiler 830 can be a compiler for compiling a neural network description into instructions to be executed by the acceleration engine 812. When the acceleration engine 812 implements a different type of accelerator, a different compiler can be used.

The compiler 830 can be activated, for example, when the operating system 820 receives keyboard, mouse, touchscreen, voice command, or other inputs from the Input/Output devices 808. The inputs can further include parameters for the compiler 830, such as input code 842 to compile and configuration options for the compilation process. Once the compiler 830 is activated, the processor 802 can load the instructions for the compiler 830 into the processor memory 804, and execute the compiler from the processor memory 804. In some implementations, compiler 830 may identifying steps to be performed by the processor 802, rather than by the acceleration engine 812. For example, the processor 802, through the execution of a driver 822, may need to perform steps such as configuring Direct Memory Access (DMA) descriptors for moving data into or out of the acceleration engine 812, among other examples.

In the example of FIG. 8, the compiler 830 includes a first stage 832, a second stage 836, and a third stage 840, which each perform different operations to produce compiled code 844. In other examples, the compiler 830 can combine the operations of the first stage 832, second stage 836, and/or third stage 840 into fewer stages, or can divide the operations of one or more of the stages into multiple stages. In some implementations, compiler 830 can also be modified such that certain operation(s) from one stage can be executed in a different stage.

The first stage 832 (may also be referred to as the front stage) can receive and process input code 842. The input code 842 can describe a program in a high-level programming language, such as Python, Java, C++, among other examples, and may utilize software libraries tailored for neural networks such as TensorFlow, PyTorch, etc. The input code 842 can be a description of a neural network model that describe, for example, steps to perform image recognition, speech recognition, machine translation, or other operations. The input code 842 can be obtained from the storage device 806. Alternatively, though not illustrated, the input code 842 can be located in the processor memory 804, or can be obtained from a network location using the network interface 810.

Processing of the input code 842 can include parsing the input code 842, performing syntax and semantic analysis on the input code 842 to identify operators (e.g., operations such as computations, memory accesses, and/or other functions, etc.) described in the input code 842, and sorting the operators described in the input code 842. For example, the operators described in the input code 842 can be sorted into layers, where the outputs of one layer provide the inputs to a next layer. The output of the first stage 832 can be an intermediate representation (IR) 834 of the input code 842. In some implementations, the IR 834 can be code representing a compute graph (e.g., data flow graph, data dependency graph, etc.). The compute graph may include nodes and edges connecting the nodes. The nodes may represent operators such as computations, data rearrangements such as transformations, memory accesses, and/or other operations; and the edges or connections between the nodes may represent dependencies between the nodes, such as data dependencies, memory dependencies, or operational dependencies, among other examples. The compute graph can be organized, for example, in the layers, nodes, and connections between nodes of a neural network model.

The second stage 836 (may also be referred to as the middle-end stage) can perform intermediate processing on the IR 834 output from the first stage 832. The intermediate processing may include performing various optimizations on the IR 834. The optimizations may include target independent optimizations that are hardware agnostic, and/or target specific optimizations that are tailored for the hardware architecture executing the program of input code 842. Target independent optimizations may include algebraic simplification, graph minimization such as removal of unnecessary or redundant operations and/or dependencies, high-level dependency optimization by rearranging operators to improve compute latencies, etc.

Target specific optimizations include optimizations that take into account the capabilities of the hardware (e.g., acceleration engine 812) that the input code is being compiled for. Such optimizations may include operators fusion to fuse multiple operators into an execution kernel supported by the hardware, data layout transformation to efficiently fit data into the hardware, etc. The target specific optimizations may take into account considerations such as whether the operations being performed in any one layer, or at any one node in a layer, may be too many for the acceleration engine 812 to perform at the same time. The acceleration engine 812 may, for example, have a limited amount of local storage space for the data needed for a computation, or the computations may be more than the acceleration engine 812 can perform at one time. In such scenario, the operators of the layer or node can be broken down into smaller operations, which can fit into the acceleration engine's local memory and/or can fit into the computing capacity of the acceleration engine 812. The output of the second stage 836 can be an optimized IR 838 such as code representing an optimized compute graph. In some implementations, the data layout analysis 837 described herein can be implemented in the second stage 836, although the data layout analysis 837 can also be implemented in a different stage such as the third stage 840.

The third stage 840 (may also be referred to as the back-end stage) can operate on the output 838 of the second stage 836, and perform various steps before producing the instructions (e.g., machine code) that are to be executed by the acceleration engine 812. These steps can include instruction and data scheduling, register allocation, and/or code generation. Instruction and data scheduling determines the order in which instructions are executed and data are processed by the acceleration engine 812, and may include low-level dependency optimization by rearranging operations to improve parallel execution, handling dependencies between nodes by inserting synchronization instructions into the code, etc. Register allocation may include identifying optimizations in register usage and/or memory bandwidth usage to avoid spilling, and reordering of register and/or memory accesses to hide access latencies given the memory capacity of the hardware, etc. Code generation converts the low-level optimized IR into machine code executable by the acceleration engine 812, and includes mapping operations into hardware instructions according to the architecture of the acceleration engine 812. The output of the third stage 840 is compiled code 844, which may include machine instructions in binary format. In some examples, the compiled code 844 can be stored in the processor memory 804. Alternatively or additionally, the compiled code 844 can be copied to the storage device 806 or to a network location. As noted above, the acceleration engine 812 may be located at a different host system, in which case the compiled code 844 can be sent over the network interface 810 to the other host system.

In the example of FIG. 8, the host system 800 can be executing a driver 822, which can also be referred to as a device driver or runtime driver, that manages the acceleration engine 812. The driver 822 can provide an interface between applications executing on the host system 800 (or on another host system) and the acceleration engine 812. For example, the driver 822 can provide an Application Program Interface (API) that defines functions for feeding input data to the acceleration engine 812 and defining the operation to perform on the input data. In this and other examples, the driver 822 can configure the acceleration engine 812 to perform the operation. For example, the driver 822 can identify a neural network model that the acceleration engine 812 is to execute, as well as the location in the processor memory 804 or on the storage device 806 where the compiled code 844 for the neural network model is located. The driver 822 can further load into the acceleration engine 812 or cause the acceleration engine 812 to load the compiled code 844, can load or cause the acceleration engine 812 to load the input data on which the neural network model is to operate, and/or can cause the acceleration engine 812 to being executing on the input data. Once the acceleration engine 812 has finished, the acceleration engine 812 can notify the driver 822, and the driver 822 can deliver a result back to the application that requested the result.

Figure 9:
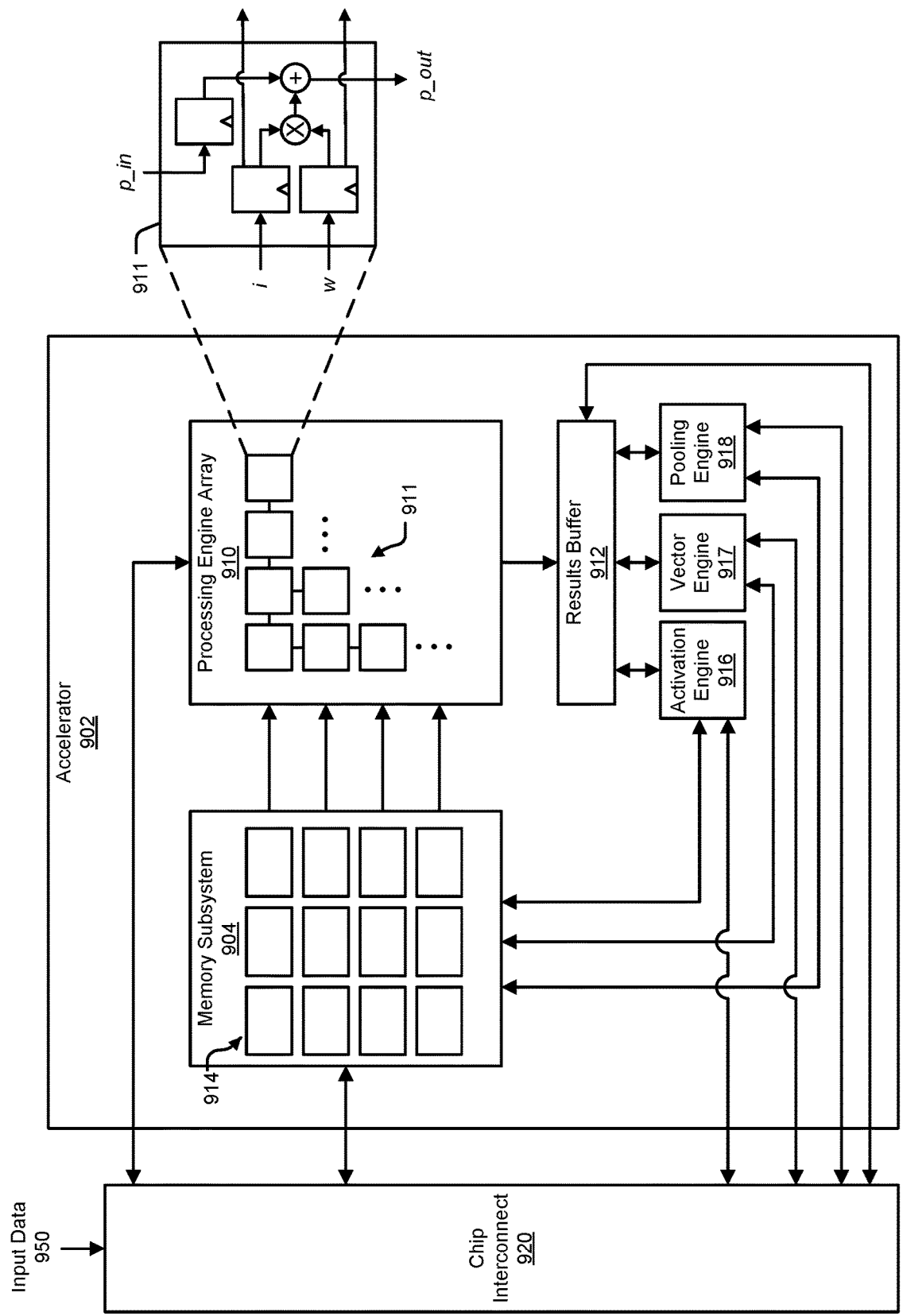
FIG. 9 illustrates a block diagram of an example of an integrated circuit device.

FIG. 9 is a block diagram illustrating an example of an integrated circuit device that can execute a neural network model. The example of FIG. 9 illustrates an accelerator 902. In various examples, the accelerator 902, for a set of input data (e.g., input data 950), can execute computations using a processing engine array 910, an activation engine 916, a vector engine 917, and/or a pooling engine 918. In some examples, the example accelerator 902 may be an integrated circuit component of a processor, such as a neural network processor. The processor may have other integrated circuit components, including additional accelerator engines.

In various implementations, the memory subsystem 904 can include multiple memory banks 914. In these implementations, each memory bank 914 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 914. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 904 can permit simultaneous access to the read or write channels of multiple memory banks. As another example, the memory subsystem 904 can include arbitration logic such that arbitration between, for example, the outputs of multiple memory banks 914 can result in more than one memory bank's output being used. In these and other examples, though globally managed by the memory subsystem 904, each memory bank can be operated independently of any other.

Having the memory banks 914 be independently accessible can increase the efficiency of the accelerator 902. For example, values can be simultaneously read and provided to each row of the processing engine array 910, so that the entire processing engine array 910 can be in use in one clock cycle. As another example, the memory banks 914 can be read at the same time that results computed by the processing engine array 910 are written to the memory subsystem 904. In contrast, a single memory may be able to service only one read or write at a time. With a single memory, multiple clock cycles can be required, for example, to read input data for each row of the processing engine array 910 before the processing engine array 910 can be started.

In various implementations, the memory subsystem 904 can be configured to simultaneously service multiple clients, including the processing engine array 910, the activation engine 916, the vector engine 917, the pooling engine 918, and any external clients that access the memory subsystem 904 over a communication fabric 920. In some implementations, being able to service multiple clients can mean that the memory subsystem 904 has at least as many memory banks as there are clients. In some cases, each row of the processing engine array 910 can count as a separate client. In some cases, each column of the processing engine array 910 can output a result, such that each column can count as a separate write client. In some cases, output from the processing engine array 910 can be written into the memory banks 914 that can then subsequently provide input data for the processing engine array 910. As another example, the activation engine 916, the vector engine 917, and the pooling engine 918 can include multiple execution channels, each of which can be separate memory clients. The memory banks 914 can be implemented, for example, using static random access memory (SRAM).

In various implementations, the memory subsystem 904 can include control logic. The control logic can, for example, keep track of the address spaces of each of the memory banks 914, identify memory banks 914 to read from or write to, and/or move data between the memory banks 914. In some implementations, memory banks 914 can be hardwired to particular clients. For example, a set of memory banks 914 can be hardwired to provide values to the rows of the processing engine array 910, with one memory bank servicing each row. As another example, a set of memory banks can be hard wired to receive values from columns of the processing engine array 910, with one memory bank receiving data for each column.

The processing engine array 910 is the computation matrix of the example accelerator 902. The processing engine array 910 can, for example, execute parallel integration, convolution, correlation, and/or matrix multiplication, among other things. The processing engine array 910 includes multiple processing engines 911, arranged in rows and columns, such that results output by one processing engine 911 can be input directly into another processing engine 911. Processing engines 911 that are not on the outside edges of the processing engine array 910 thus can receive data to operate on from other processing engines 911, rather than from the memory subsystem 904.

In various examples, the processing engine array 910 uses systolic execution, in which data arrives at each processing engine 911 from different directions at regular intervals. In some examples, input data can flow into the processing engine array 910 from the left and weight values can be loaded at the top. In some examples weights and input data can flow from the left and partial sums can flow from top to bottom. In these and other examples, a multiply-and-accumulate operation moves through the processing engine array 910 as a diagonal wave front, with data moving to the right and down across the array. Control signals can be input at the left at the same time as weights, and can flow across and down along with the computation.

In various implementations, the number of columns in the processing engine array 910 determines the computational capacity of the processing engine array 910, and the number of rows determines the required memory bandwidth for achieving maximum utilization of the processing engine array 910. The processing engine array 910 can have, for example, 64 columns and 128 rows, or some other number of columns and/or rows.

An example of a processing engine 911 is illustrated in FIG. 9 in an inset diagram. As illustrated by this example, a processing engine 911 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 911.

In the illustrated example, an input from above can include a partial sum, p_in, provided either from another processing engine 911 or from a previous round of computation by the processing engine array 910. When starting a computation for a new set of input data, the top row of the processing engine array 910 can receive a fixed value for p_in, such as zero. As illustrated by this example, i and w are multiplied together and the result is summed with p_in to produce a new partial sum, p_out, which can be input into another processing engine 911. Various other implementations of the processing engine 911 are possible.

Outputs from the last row in the processing engine array 910 can be temporarily stored in the results buffer 912. The results can be intermediate results, which can be written to the memory banks 914 to be provided to the processing engine array 910 for additional computation. Alternatively, the results can be final results, which, once written to the memory banks 914 can be read from the memory subsystem 904 over the communication fabric 920, to be output by the system.

In some implementations, the accelerator 902 includes an activation engine 916. In these implementations, the activation engine 916 can combine the results from the processing engine array 910 into one or more output activations. For example, for a convolutional neural network, convolutions from multiple channels can be summed to produce an output activation for a single channel. In other examples, accumulating results from one or more columns in the processing engine array 910 may be needed to produce an output activation for a single node in the neural network. In some examples, activation engine 916 can be bypassed.

In various examples, the activation engine 916 can include multiple separate execution channels. In these examples, the execution channels can correspond to the columns of the processing engine array 910, and can perform an operation on the outputs of a column, the result of which can be stored in the memory subsystem 904. In these examples, the activation engine 916 may be able to perform between 1 and n parallel computations, where n is equal to the number of columns in the processing engine array 910. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 902 can include a pooling engine 918. Pooling is the combining of outputs of the columns of the processing engine array 910. Combining can include for example, computing a maximum value, a minimum value, an average value, a median value, a summation, a multiplication, or another logical or mathematical combination. In various examples, the pooling engine 918 can include multiple execution channels that can operating on values from corresponding columns of the processing engine array 910. In these examples, the pooling engine 918 may be able to perform between 1 and n parallel computations, where n is equal to the number of columns in the processing engine array 910. In various examples, execution channels of the pooling engine 918 can operate in parallel and/or simultaneously. In some examples, the pooling engine 918 can be bypassed.

In some implementations, the accelerator 902 can further include a vector engine 917. Vector engine 917 is a compute engine that can perform computations and manipulations on values stored in memory subsystem 904 and/or results buffer 912 such as values representing matrices of input values, weight values, intermediate results, etc. Vector engine 917 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 917 can operate in parallel and/or simultaneously. In some examples, the vector engine 917 can be bypassed or be omitted.

Herein, the activation engine 916, the vector engine 917, and the pooling engine 918 may be referred to collectively as execution engines. The processing engine array 910 is another example of an execution engine. Another example of an execution engine is a Direct Memory Access (DMA) engine, which may be located outside the accelerator 902.

Input data 950 can arrive over the communication fabric 920. The communication fabric 920 can connect the accelerator 902 to other components of a processor, such as a DMA engine that can obtain input data 950 from an Input/Output (I/O) device, a storage drive, or a network interface. The input data 950 can be, for example one-dimensional data, such as a character string or numerical sequence, or two-dimensional data, such as an array of pixel values for an image or frequency and amplitude values over time for an audio signal. In some examples, the input data 950 can be three-dimensional, as may be the case with, for example, the situational information used by a self-driving car or virtual reality data. In some implementations, the memory subsystem 904 can include a separate buffer for the input data 950. In some implementations, the input data 950 can be stored in the memory banks 914 when the accelerator 902 receives the input data 950.

In some examples, the accelerator 902 can implement a neural network processing engine. In these examples, the accelerator 902, for a set of input data 950, can execute a neural network to perform a task for which the neural network was trained. Executing a neural network on a set of input data can be referred to as inference or performing inference.

The weights for the neural network can be stored in the memory subsystem 904, along with input data 950 on which the neural network will operate. The neural network can also include instructions, which can program the processing engine array 910 to perform various computations on the weights and the input data. The instructions can also be stored in the memory subsystem 904, in the memory banks 914 or in a separate instruction buffer. The processing engine array 910 can output intermediate results, which represent the outputs of individual layers of the neural network. In some cases, the activation engine 916, the vector engine 917, and/or pooling engine 918 may be enabled for computations called for by certain layers of the neural network. The accelerator 902 can store the intermediate results in the memory subsystem 904 for inputting into the processing engine array 910 to compute results for the next layer of the neural network. The processing engine array 910 can further output final results from a last layer of the neural network. The final results can be stored in the memory subsystem 904 and then be copied out to host processor memory or to another location.

Figure 10:
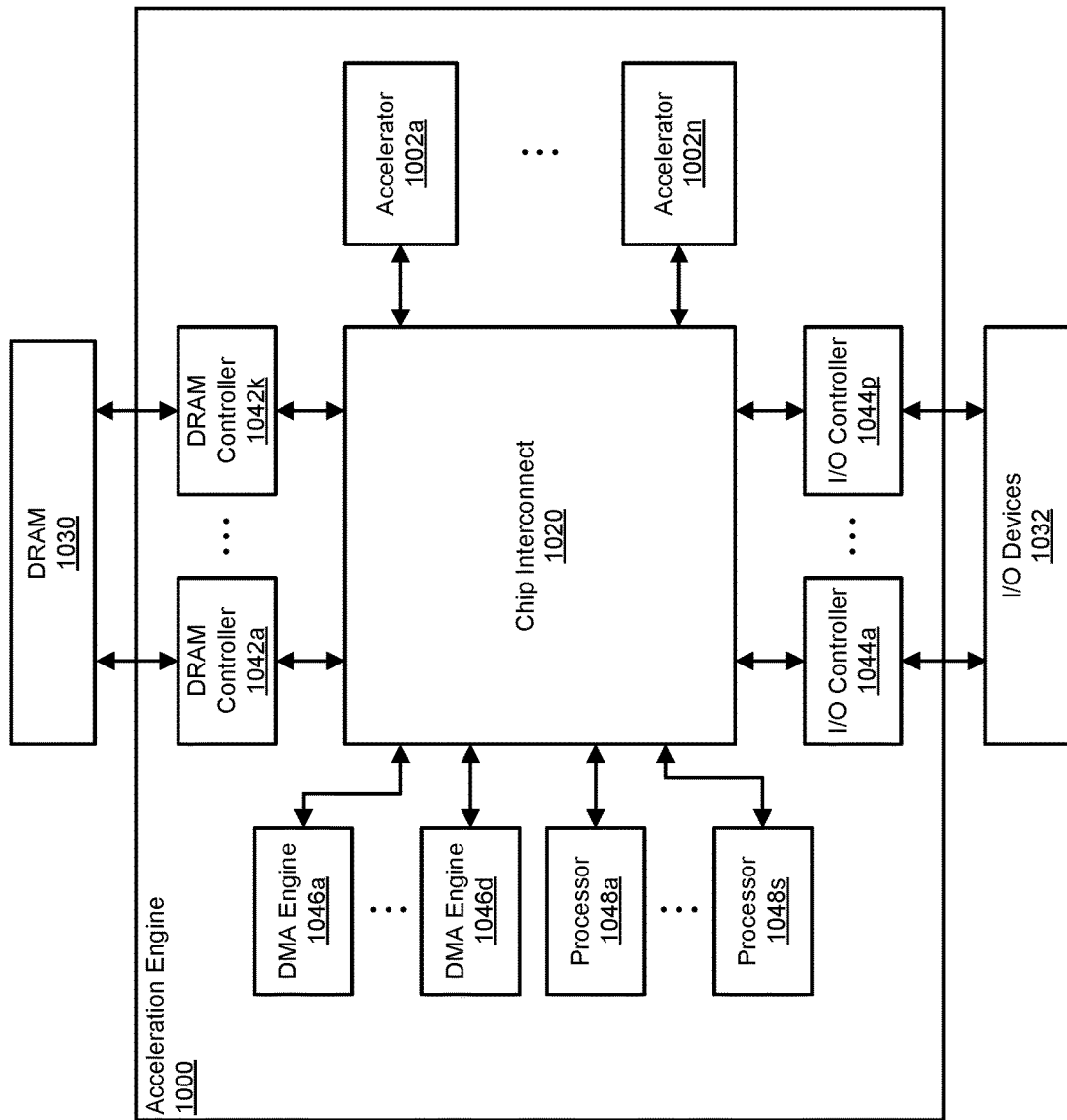
FIG. 10 illustrates a block diagram of an example of an acceleration engine.

FIG. 10 includes a block diagram that illustrates an example of an acceleration engine 1000. The acceleration engine 1000 is an example of an integrated circuit that can include one or more accelerators 1002a-1002n that may be similar to the accelerator illustrated in FIG. 9.

In the example of FIG. 10, the acceleration engine 1000 includes multiple accelerators 1002a-1002n, each of which can perform a set of operations. In various examples, the accelerators 1002a-1002n are for particular types of operations, so that the accelerators 1002a-1002n can perform the operations much faster than when similar operations are performed by a general-purpose processor. In various examples, to perform a set of operations, input data on which the operations are to be performed must first be moved into the accelerators 1002a-1002n. Additionally, in some cases, program code is also moved into the accelerators 1002a-1002n, which programs the operations that the accelerators 1002a-1002n will perform on the data. In the illustrated example, the acceleration engine 1000 includes n accelerators 1002a-1002n. Examples of accelerators that can be included in the acceleration engine 1000 include graphics accelerators, floating point accelerators, neural network accelerators, and others. In various examples, the accelerators 1002a-1002n can each be the same (e.g., each of the is a graphics accelerator) or can be different (e.g., the accelerators 1002a-1002n include a graphics accelerator, a floating point accelerator, and neural network accelerator).

The example acceleration engine 1000 further includes DRAM controllers 1042a-1042k for communicating with an external memory. The external memory is implemented, in this example, using DRAM 1030. In the illustrated example, the acceleration engine 1000 includes k DRAM controllers 1042a-1042k, each of which may be able to communicate with an independent set of banks of DRAM. In other examples, other types of RAM technology can be used for the external memory. The DRAM controllers 1042a-1042k can also be referred to as memory controllers.

In various examples, input data and/or program code for the accelerators 1002a-1002n can be stored in the DRAM 1030. Different programs can cause the accelerators 1002a-1002n to perform different operations. For example, when one of the accelerators is a neural network accelerator, one program can configure the neural network accelerator to perform speech recognition while another program can configure the neural network accelerator to perform image recognition. In various examples, different accelerators 1002a-1002n can be programmed with different programs, so that each performs a different set of operations. In various examples, the processors 1048a-1048s can manage moving of program code from the DRAM 1030 to the accelerators 1002a-1002n.

The example acceleration engine 1000 further includes I/O controllers 1044a-1044p for communicating with I/O devices 1032 in the system. The acceleration engine 1000 can communicate with I/O devices over, for example, a processor bus. In some examples, the processor bus can be implemented using Peripheral Component Interconnect (PCI) and/or a variation of the PCI bus protocol. The processor bus can connect the acceleration engine 1000 to I/O devices such as, for example, input and output devices, memory controllers, storage devices, and/or network interface cards, among other things. In some examples, the I/O controllers 1044-1044p can enable the acceleration engine 1000 to act as an I/O device for a host processor. For example, the acceleration engine 1000 can be the recipient of input data from the host processor, and a command indicating an operation to be performed on the input data (e.g., a particular computation or analysis). In the illustrated example, the acceleration engine 1000 includes p I/O controllers 1044a-1044p, each of which may include a separate root complex and may communicate with a separate set of I/O devices 1032. In other examples, other standardized bus protocols, such as Ultra Path Interconnect (UPI) can be used for the host bus. In other examples, a proprietary bus protocol can be used.

Movement of data in the acceleration engine 1000 can be managed by one or more processors 1048a-1048s, which can also be referred to as data management processors. In the example of FIG. 10, the acceleration engine 1000 includes s processors 1048a-1048s incorporated into the device (e.g., on the same silicon die). In other examples, the processors 1048a-1048s can be external to the acceleration engine 1000 (e.g., on a different die and/or in a different package). In some examples, the processors 1048a-1048s can manage the movement of data from I/O devices 1032 to the accelerators 1002a-1002n or the DRAM 1030. For example, input data may be located at an I/O device 1032 or in processor memory, and the processors 1048a-1048s can move the input from the I/O device 1032 or processor memory into an accelerator or into DRAM 1030. As another example, program code for the accelerators 1002a-1002n may be located on an I/O device 1032 or in processor memory.

The example acceleration engine 1000 further includes DMA engines 1046a-1046d that can move data between the accelerators 1002a-1002n, DRAM controllers 1042a-1042k, and I/O controllers 1044a-1044p. In the illustrated example, the acceleration engine 1000 includes d DMA engines 1046a-1046d. In some implementations, the DMA engines 1046a-1046d can be assigned to specific tasks, such as moving data from the DRAM controllers 1042a-1042d to the accelerators 1002a-1002n, or moving data between the I/O controllers 1044a-1044p and the accelerators 1002a-1002n. These tasks can be assigned, for example, by enqueueing descriptors with the DMA engines 1046a-1046d, where a descriptor identifies an address for a block of data and an operation (e.g., a read or a write) to perform. A descriptor, for example, can direct a DMA engine to instruct a DMA controller to read a block of data from DRAM 1030. A descriptor can, as a further example, instruct the DMA engine to write data, read by the DMA controller, to an accelerator. Further descriptors can be used to move data from an accelerator to DRAM 1030.

In various examples, each of the processors 1048a-1048s can be responsible for managing the data movement for a different accelerator. In some examples, a processor may manage the data movement for more than one accelerator. Similarly, in various examples, each of the processors 1048a-1048s can be assigned to one or more DMA engines 1046a-1046d. In these and other examples, associations between processors 1048a-1048s, accelerators 1002a-1002n, and DMA engines 1046a-1046d are determined by program code being executed by each respective processor.

In the example acceleration engine 1000, the various components can communicate over a chip interconnect 1020. The chip interconnect 1020 primarily includes wiring for routing data between the components of the acceleration engine 1000. In some cases, the chip interconnect 1020 can include a minimal amount of logic, such as multiplexors to control the direction of data, flip-flops for handling clock domain crossings, and timing logic.

Figure 11:
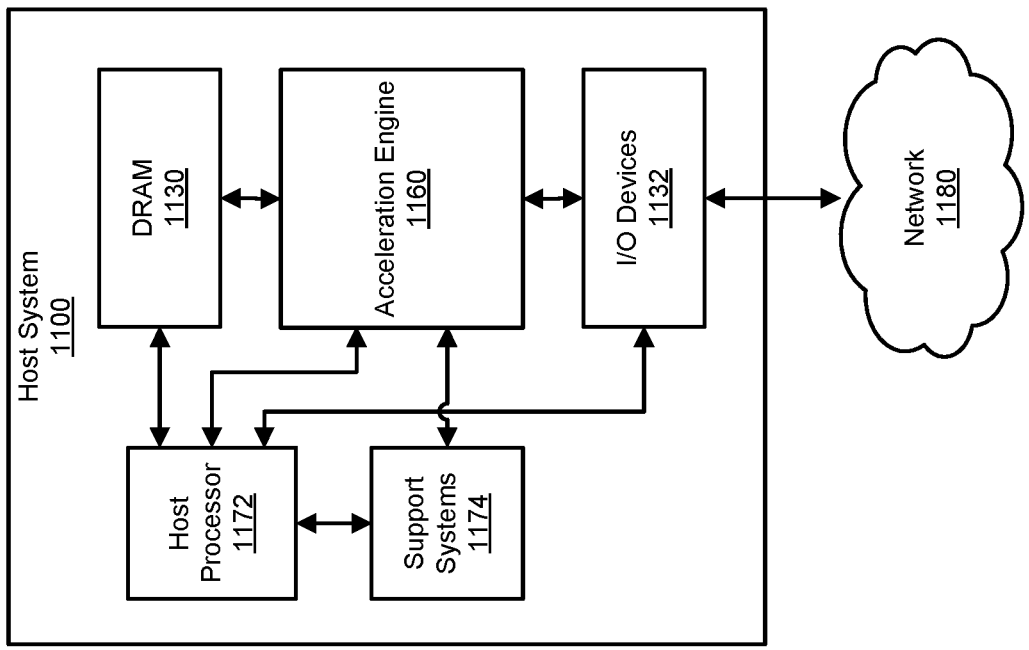
FIG. 11 illustrates a block diagram of an example of a host system.

FIG. 11 includes a block diagram that illustrates an example of a host system 1100 in which an acceleration engine 1160 can be used. The acceleration engine 1160 of FIG. 11 is an example of a device that can include one or more accelerators such as is illustrated in FIG. 10. The example host system 1100 of FIG. 11 includes the acceleration engine 1160, a host processor 1172, DRAM 1130 or processor memory, I/O devices 1132, and support systems 1174. In various implementations, the host system 1100 can include other hardware that is not illustrated here.

The host processor 1172 is a general-purpose integrated circuit that is capable of executing program instructions. In some examples, the host processor 1172 can include multiple processing cores. A multi-core processor may include multiple processing units within the same processor. In some examples, the host system 1100 can include more than one host processor 1172. In some examples, the host processor 1172 and the acceleration engine 1160 can be one chip, such as, one or more integrated circuits within the same package.

In various examples, the host processor 1172 can communicate with other components in the host system 1100 over one or more communication channels. For example, the host system 1100 can include a host processor bus, which the host processor 1172 can use to communicate with the DRAM 1130, for example. As another example, the host system 1100 can include an I/O bus, such as a PCI-based bus, over which the host processor 1172 can communicate with the acceleration engine 1160 and/or the I/O devices 1132, for example. In various examples, the host system 1100 can, alternatively or additionally, include other communication channels or busses, such as serial busses, power management busses, storage device busses, and so on.

In some examples, software programs executing on the host processor 1172 can receive or generate input for processing by the acceleration engine 1160. In some examples, the programs can select an appropriate neural network to execute for a given input. For example, a program may be for language translation, and can select one or more neural networks capable of speech recognition and/or machine translation. In these and other examples, the programs can configure the acceleration engine 1160 with the neural network to execute, and/or can select a neural network processing engine on the acceleration engine 1160 that has previously been configured to execute the desired neural network. In some examples, once the acceleration engine 1160 has started an inference on input data, the host processor 1172 can manage the movement of data (such as weights, instructions, intermediate results, results of conditional layers, and/or final results) into or out of the acceleration engine 1160.

In some examples, a software program that is using the acceleration engine 1160 to conduct an inference can read the result from a conditional layer from the acceleration engine 1160 and/or from a storage location, such as in DRAM 1130. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1130 is memory that is used by the host processor 1172 for storage of program code that the host processor 1172 is in the process of executing, as well as values that are being operated on. In some examples, the data for a neural network (e.g., weight values, instructions, and other data) can be all or partially stored in the DRAM 1130. DRAM is a common term for processor memory, and though DRAM is volatile memory, processor memory can be volatile and/or non-volatile. Though not illustrated here, the host system 1100 can include other volatile and non-volatile memories for other purposes. For example, the host system 1100 can include a Read-Only Memory (ROM) that stores boot code for booting the host system 1100 at power on, and/or Basic Input/Output System (BIOS) code.

Though not illustrated here, the DRAM 1130 can store instructions for various programs, which can be loaded into and be executed by the host processor 1172. For example, the DRAM 1130 can be storing instructions for an operating system, one or more data stores, one or more application programs, one or more drivers, and/or services for implementing the features disclosed herein.

The operating system can manage and orchestrate the overall operation of the host system 1100, such as scheduling tasks, executing applications, and/or controller peripheral devices, among other operations. In some examples, a host system 1100 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1100. For example, some drivers can provide communication between the operating system and peripheral devices or I/O devices 1132. Alternatively or additionally, some drivers may provide communication between application programs and the operating system, and/or application programs and peripheral devices accessible to the host system 1100. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1132 can include hardware for connecting to user input and output devices, such as keyboards, mice, pens, tablets, voice input devices, touch input devices, displays or monitors, speakers, and printers, among other devices. The I/O devices 1132 can also include storage drives and/or network interfaces for connecting to a network 1180. For example, the host system 1100 can use a network interface to communicate with storage devices, user terminals, other computing devices or servers, and/or other networks, among various examples.

In various examples, one or more of the I/O devices 1132 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1100 or may be in an external enclosure. A storage device can be fixed (e.g., attached by screws) or removable (e.g., having a physical release mechanism and possibly a hot-plug mechanism).

Storage devices, the DRAM 1130, and any other memory component in the host system 1100 are examples of computer-readable storage media. Computer-readable storage media are physical mediums that are capable of storing data in a format that can be read by a device such as the host processor 1172. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1132 can be PCI-based devices. In these examples, a PCI-based I/O device includes a PCI interface for communicating with the host system 1100. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1174 can include hardware for coordinating the operations of the acceleration engine 1160. For example, the support systems 1174 can include a microprocessor that coordinates the activities of the acceleration engine 1160, including moving data around on the acceleration engine 1160. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1172. In some examples, the program executed by the microprocessor is stored on the hardware of microprocessor, or on a non-volatile memory chip in the host system 1100. In some examples, the microprocessor and the acceleration engine 1160 can be on chip, such as one integrated circuit on the same die and in the same package.

In some examples, the support systems 1174 can be responsible for taking instructions from the host processor 1172 when programs executing on the host processor 1172 request the execution of a neural network. For example, the host processor 1172 can provide the support systems 1174 with a set of input data and a task that is to be performed on the set of input data. In this example, the support systems 1174 can identify a neural network that can perform the task, and can program the acceleration engine 1160 to execute the neural network on the set of input data. In some examples, the support systems 1174 only needs to select an appropriate neural network processing engine of the neural network processor. In some examples, the support systems 1174 may need to load the data for the neural network onto the acceleration engine 1160 before the acceleration engine 1160 can start executing the neural network. In these and other examples, the support systems 1174 can further receive the output of executing the neural network, and provide the output back to the host processor 1172.

In some examples, the operations of the support systems 1174 can be handled by the host processor 1172. In these examples, the support systems 1174 may not be needed and can be omitted from the host system 1100.

In various examples, the host system 1100 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1100 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method for compiling a neural network model, the computer-implemented method comprising:
   obtaining a description of the neural network model;
   generating a representation of a compute flow graph of the neural network model, wherein the compute flow graph comprises a plurality of connected components, and wherein each connected component of the plurality of connected components includes a set of connected nodes representing loopnests in the neural network model;
   for each connected component of the plurality of connected components:
      initializing nodes in the connected component that are associated with operators having a fixed data layout into an initial set of one or more layout groups; and
      iteratively merging a frontier node that has a lowest initialization cost with one or more layout groups adjacent to the frontier node until all the nodes in the connected component are merged into a single data layout group having a compatible data layout,
      wherein merging the frontier node includes resolving data layout conflicts between loopnests having different data layouts by performing one or more of decaying an iteration axis or inserting a transpose operation, and
      wherein an initialization cost of the frontier node is determined based on a prioritized list of attributes including a metric of prior information known about the frontier node, an instruction count, a transpose count, and a direct memory access (DMA) count associated with the frontier node; and
   generating machine instructions for the neural network model based on data layouts of the plurality of connected components, wherein the machine instructions are executed on a neural network accelerator to implement the neural network model.

2. The computer-implemented method of claim 1, wherein the data layout conflicts are resolved using fixed point iteration.

3. The computer-implemented method of claim 1, wherein the metric of prior information known about the frontier node has a highest priority in the prioritized list of attributes.

4. The computer-implemented method of claim 1, wherein the transpose operation is one of a partition-to-free axis transpose, a block-to-free axis transpose, or a direct memory access (DMA) copy transpose.

5. A computer-implemented method comprising:
   obtaining a representation of a set of connected nodes representing loopnests in a compute flow graph, wherein the compute flow graph represents a computational flow of a neural network model;
   initializing, into a set of layout groups, nodes in the set of connected nodes that are associated with operators having a fixed data layout;
   iteratively performing a set of merging operations to form a single layout group from the set of connected nodes, wherein the set of merging operations includes:
      identifying a set of frontier nodes adjacent to the set of layout groups;
      determining an initialization cost of each frontier node of the set of frontier nodes;

selecting a frontier node of the set of frontier nodes having a lowest initialization cost; and
merging the selected frontier node of the set of frontier nodes with one or more adjacent layout groups to form a new layout group having a compatible data layout; and
generating machine instructions for the neural network model based on data layouts of the set of connected nodes, wherein the machine instructions are executed on a neural network accelerator to implement the neural network model.

6. The computer-implemented method of claim 5, wherein the operators having the fixed data layout include matrix multiplication operators, gather operators, or scatter operators.

7. The computer-implemented method of claim 5, wherein initializing nodes associated with the operators having the fixed data layout includes converging the nodes in each layout group of the set of layout groups by resolving data layout conflicts between adjacent loopnests having different data layouts.

8. The computer-implemented method of claim 5, wherein a data layout conflict is resolved by:
classifying each iterator in the loopnests into one of a free axis, a partition axis, or a block axis; and
performing one or more data layout manipulations, wherein a data layout manipulation includes performing an axis decay or inserting a transpose operation.

9. The computer-implemented method of claim 8, wherein the axis decay includes decaying a partition axis to a block axis, or decaying a free axis to a block axis.

10. The computer-implemented method of claim 8, wherein performing the axis decay includes propagating the axis decay to adjacent nodes.

11. The computer-implemented method of claim 8, wherein the transpose operation is one of a partition-to-free axis transpose, a block-to-free axis transpose, or a direct memory access (DMA) copy transpose.

12. The computer-implemented method of claim 8, wherein the data layout conflict is resolved using fixed point iteration.

13. The computer-implemented method of claim 5, wherein determining the initialization cost of each frontier node of the set of frontier nodes includes:
determining a set of layout candidates for the frontier node;
selecting an optimal transpose path for each layout candidate of the set of layout candidates;
determining a cost for each layout candidate of the set of layout candidates based on the optimal transpose path for the layout candidate;
selecting a layout candidate having a lowest cost; and
using the lowest cost to derive the initialization cost of the frontier node.

14. The computer-implemented method of claim 13, wherein determining the set of layout candidates for the frontier node includes selecting a number of layout candidates from possible layout candidates for the frontier node using an estimator.

15. The computer-implemented method of claim 14, wherein the number of layout candidates selected is based on a complexity of the set of connected nodes.

16. The computer-implemented method of claim 5, wherein the initialization cost of the frontier node is based on a prioritized list of attributes.

17. The computer-implemented method of claim 16, wherein the prioritized list of attributes includes a metric of prior information known about the frontier node.

18. The computer-implemented method of claim 16, wherein the prioritized list of attributes includes an instruction count, a transpose count, and a direct memory access (DMA) count associated with the frontier node.

19. A non-transitory computer-readable storage medium having stored therein instructions that, when executed by one or more processors, cause the one or more processors to execute a compiler, the compiler performing operations including:
obtaining a representation of a set of connected nodes representing loopnests in a compute flow graph, wherein the compute flow graph represents a computational flow of a neural network model;
initializing, into a set of layout groups, nodes in the set of connected nodes that are associated with operators having a fixed data layout;
iteratively performing a set of merging operations to form a single layout group from the set of connected nodes, wherein the set of merging operations includes:
identifying a set of frontier nodes adjacent to the set of layout groups;
determining an initialization cost of each frontier node of the set of frontier nodes;
selecting a frontier node of the set of frontier nodes having a lowest initialization cost; and
merging the selected frontier node of the set of frontier nodes with one or more adjacent layout groups to form a new layout group having a compatible data layout; and
generating machine instructions for the neural network model based on data layouts of the set of connected nodes, wherein the machine instructions are executed on a neural network accelerator to implement the neural network model.

20. The non-transitory computer-readable storage medium of claim 19, wherein determining the initialization cost of each frontier node of the set of frontier nodes includes:
determining a set of layout candidates for the frontier node;
selecting an optimal transpose path for each layout candidate of the set of layout candidates;
determining a cost for each layout candidate of the set of layout candidates based on the optimal transpose path for the layout candidate;
selecting a layout candidate having a lowest cost; and
using the lowest cost to derive the initialization cost of the frontier node.

* * * * *